(12) United States Patent
Baldasare et al.

(10) Patent No.: US 10,070,250 B2
(45) Date of Patent: Sep. 4, 2018

(54) SYSTEM AND METHOD FOR PROVIDING INTERCONNECTED AND SECURE MOBILE DEVICE CHARGING STATIONS

(71) Applicants: Douglas Baldasare, Philadelphia, PA (US); Sheri Tate, San Jose, CA (US); Robert Kay, Cinnaminson, NJ (US); Jens Horstmann, Santa Clara, CA (US); Colin Nolan, North Wales, PA (US); Beth Pondo, New York, NY (US)

(72) Inventors: Douglas Baldasare, Philadelphia, PA (US); Sheri Tate, San Jose, CA (US); Robert Kay, Cinnaminson, NJ (US); Jens Horstmann, Santa Clara, CA (US); Colin Nolan, North Wales, PA (US); Beth Pondo, New York, NY (US)

( * ) Notice: Subject to any disclaimer, the term of this patent is extended or adjusted under 35 U.S.C. 154(b) by 0 days.

(21) Appl. No.: 15/362,370

(22) Filed: Nov. 28, 2016

(65) Prior Publication Data
US 2017/0150304 A1 May 25, 2017

Related U.S. Application Data

(63) Continuation-in-part of application No. 14/095,866, filed on Dec. 3, 2013, now Pat. No. 9,537,994.
(Continued)

(51) Int. Cl.
*H04W 12/08* (2009.01)
*H04W 4/02* (2018.01)
(Continued)

(52) U.S. Cl.
CPC ......... *H04W 4/02* (2013.01); *H04M 1/72522* (2013.01); *H04M 1/72563* (2013.01);
(Continued)

(58) Field of Classification Search
CPC ........... H04M 1/72572; H04M 2250/10; H02J 7/0027; H02J 7/007; H02J 7/0052
See application file for complete search history.

(56) References Cited

U.S. PATENT DOCUMENTS 6,323,775 B1 * 11/2001 Hansson ............... H02J 7/0047
235/384
2005/0134225 A1 * 6/2005 Mese .................... H01M 10/42
320/132
(Continued)

*Primary Examiner* — Dung Hong
(74) *Attorney, Agent, or Firm* — Thomas J. McWilliams; Barnes & Thornburg LLP

(57) ABSTRACT

Systems and methods for locating and providing public mobile device charging stations are disclosed. One or more charging stations may be configured to charge a battery of a mobile device. A database may be configured to store location information of the one or more charging stations as well as mobile device location and security credential information of the one or more respective mobile devices. A server communicatively coupled with the one or more charging stations and the database, may be configured to determine a proximity of the one or more charging stations to a location of the mobile device. This determination may be based on the station location information and the mobile device location information. Based on the determined proximity, provide the station location information of the respective one or more charging stations to the mobile device. The charging station further provides photo and/or video surveillance security to verify a user.

13 Claims, 24 Drawing Sheets

Related U.S. Application Data

(60) Provisional application No. 61/732,731, filed on Dec. 3, 2012.

(51) Int. Cl.
 *H04W 8/18* (2009.01)
 *H04M 1/725* (2006.01)

(52) U.S. Cl.
 CPC ............ *H04W 8/18* (2013.01); *H04W 12/08*
 (2013.01); *H04W 4/023* (2013.01)

(56) References Cited

U.S. PATENT DOCUMENTS

| | | | |
|---|---|---|---|
| 2011/0032110 A1* | 2/2011 | Taguchi | B60L 3/12 340/636.1 |
| 2013/0069600 A1* | 3/2013 | Knowlton | H02J 7/008 320/162 |
| 2013/0132307 A1* | 5/2013 | Phelps | H02J 7/0027 705/412 |
| 2013/0179061 A1* | 7/2013 | Gadh | B60L 11/1842 701/123 |
| 2014/0007185 A1* | 1/2014 | Han | H04L 63/0861 726/1 |
| 2014/0035514 A1* | 2/2014 | Wang | H02J 7/0047 320/107 |
| 2014/0214321 A1* | 7/2014 | Kawamata | G01C 21/3469 701/533 |
| 2014/0285318 A1* | 9/2014 | Audeon | G07C 9/00111 340/5.61 |
| 2015/0084579 A1* | 3/2015 | Li | H02J 7/0052 320/107 |
| 2017/0077717 A1* | 3/2017 | Lundgren | H02J 7/007 |
| 2017/0187210 A1* | 6/2017 | Cogill | H02J 7/0044 |

\* cited by examiner

SYSTEM AND METHOD FOR PROVIDING INTERCONNECTED AND SECURE MOBILE DEVICE CHARGING STATIONS

CROSS REFERENCE TO RELATED APPLICATIONS

This application is a continuation-in-part of U.S. patent application Ser. No. 14/095,866, filed Dec. 3, 2013, which claims priority to U.S. Provisional Patent Application No. 61/732,731, filed Dec. 3, 2012, which are hereby incorporated by reference in their entireties.

FIELD OF THE INVENTION

The instant disclosure relates to mobile devices, and, in particular, to systems and methods for providing interconnected, secure public or private mobile device charging stations.

BACKGROUND OF THE INVENTION

Mobile devices, such as cellular phones, personal digital assistants, tablets, and the like, are now widely used and heavily depended upon for voice and data communications. In order to maintain proper power levels for the operation of the device, the battery of the mobile device needs to be recharged from time to time. Often, at inopportune times, mobile device users may be located at public locations without the ability to recharge the mobile device battery. Even with the existence of public mobile device charging stations, these stations are limited in number and location. Consequently, a mobile device user runs the risk of his mobile device battery being exhausted before locating an available station to recharge the mobile device.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

SUMMARY OF THE INVENTION

Figure 1:
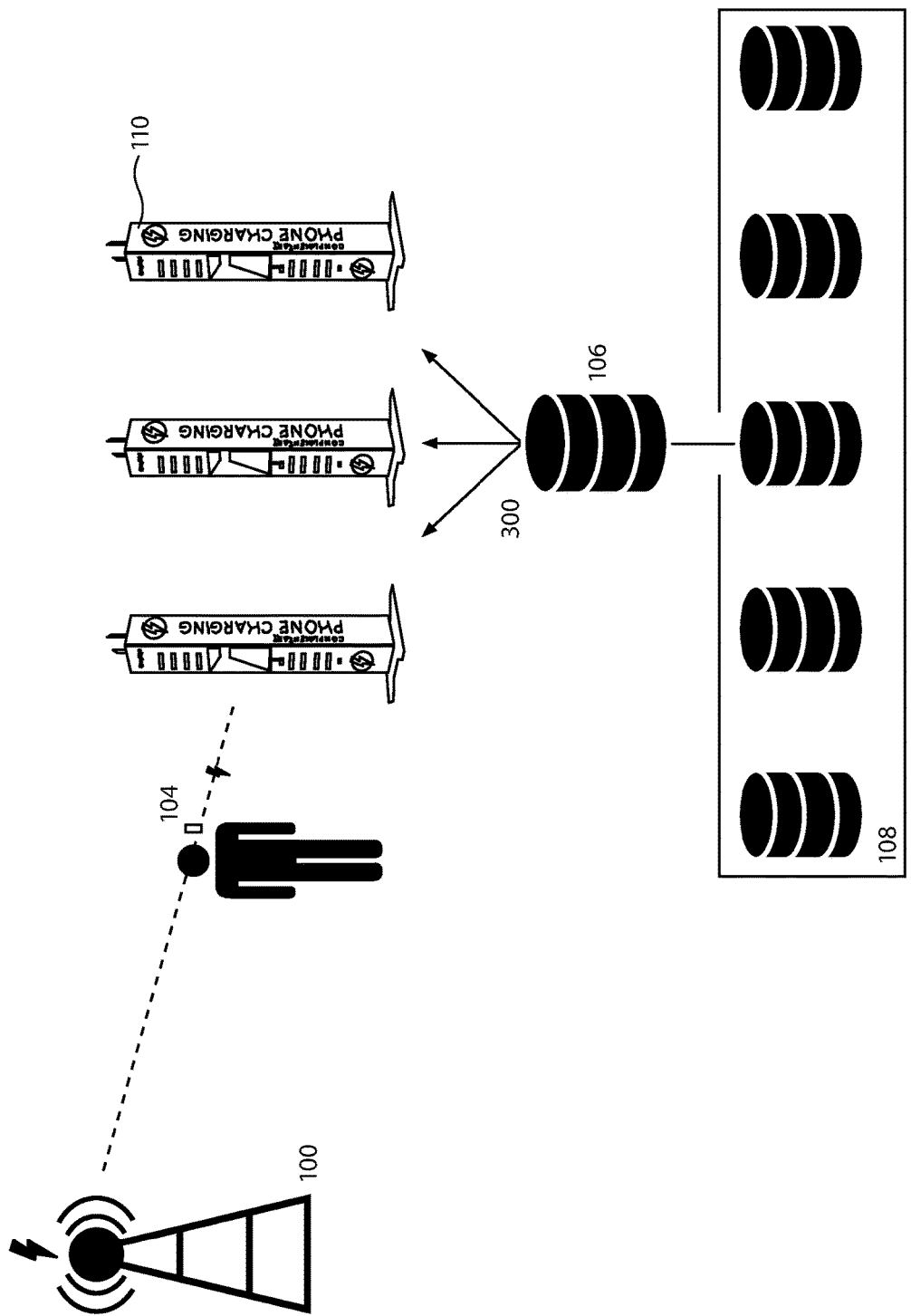
FIG. 1 illustrates a diagram of a system according to embodiments of the present invention.

The present disclosure provides systems and techniques for providing and locating public or private mobile device charging stations.

In embodiments of the present invention, one or more charging stations may be configured to charge a battery of a mobile device. A database may be configured to store location information of the one or more charging stations, as well as mobile device location, charge, and/or other information of the one or more respective mobile devices. A server communicatively coupled with the one or more charging stations and the database may be configured to determine a proximity of the one or more charging stations to a location of the mobile device. This determination may be based on the station location information and the mobile device location information. Based on the determined proximity, the server may provide the station location information of a respective one or more charging stations to the mobile device.

By way of example, the location of a charging station may be provided to a device as a push notification, such as including an indication of battery level and the closest charging station; or the location may be provided when an on-device app is proactively opened by the user to see the closest locations, such as may be assessed based on native geo-location services, for example. In the latter methodology, the battery level may not be provided, and the closest stations may be shown in any of a variety of views, such as a list view, that may be selectable by the user.

As such, the server and/or mobile application may monitor, such as pinging the device periodically for, a power level of the battery of the mobile device. Based on the power level of the battery of the mobile device, the user may be alerted via any known methodology, such as via a pop-up alert from an app, and may be provided with location information of the respective one or more charging stations nearest to the mobile device using the methods above.

Thereby, the invention may provide a system and method to alert a user of the locations of nearby public or private charging stations to charge his mobile device when the battery power level of his mobile device decreases to a low level. Moreover, the disclosed system and method also provide a system and method that provides: advertising opportunities for retailers; the ability for retailers to drive traffic to a store or stores; a mobile application—such a mobile application might indicate and/or suggest charging station locations, and/or monitor a user's use and the correspondent battery charge; and the like.

DETAILED DESCRIPTION OF THE EMBODIMENTS

It is to be understood that the figures and descriptions of the present invention have been simplified to illustrate elements that are relevant for a clear understanding of the present invention, while eliminating, for the purpose of clarity, many other elements found in typical network systems, mobile devices, telecommunications servers and telecommunications generally, and associated methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

It would be advantageous for a user to use a system to be alerted of the locations of nearby public or private charging stations to charge his mobile device when the battery power level of his mobile device decreases to a low level. It would be particularly advantageous if such a system and method also provided: advertising opportunities for retailers; the ability for retailers to drive traffic to a store or stores; a mobile application, such as a mobile application that would indicate and/or suggest charging station locations, and/or that would monitor a user's use and the correspondent battery charge; and the like.

Mobile devices, such as cellular phones, personal digital assistants, tablets, and the like are now widely used and heavily depended upon for voice and data communications, and for information generally. In order to be operational, mobile devices typically employ the use of rechargeable batteries. These batteries need to be recharged from time to time in order to maintain proper power levels for the operation of the mobile device. For example, some estimate that the typical user runs low on battery power in a mobile device approximately 4 times each week.

Because a conventional charger generally utilizes alternating current, and specifically typically uses either 110V or 220V "household" current designed for general use, it is often difficult to recharge a mobile device battery in a public place or while traveling without access to a suitable power terminal. However, the amount of current a phone accepts is generally "stepped down" from the 110V or 220V alternating current, such as typically using a "wall wart" charger that comes with the phone, as would be apparent to the skilled artisan. Thus even in the case of an available power terminal, such charging would require the user to also be traveling with a charger, which may be inconveniently bulky or easily forgotten. Similarly, while outside and/or travelling in a vehicle, the user may need to have his or her charger available (particularly, a charger that is adapted for the specific device brand and model) in order to use a vehicle's electrical power supply. Thus, public mobile device charging systems suitable for charging mobile devices are highly beneficial.

However, although charging stations are known, and due in part to the ubiquity of mobile device users and the currently limited number of publicly available mobile device charging stations, mobile device users may still have great difficulty locating a public charging station available for use. Consequently, a mobile device user regularly runs the risk of his mobile device battery being exhausted before locating an available station to recharge the mobile device.

Therefore, the present invention provides for a user to have readily available, secure charging capabilities. This is contrary to presently available charging solutions, which are non-secure at least in that the only security is provided when the user stands nearby to "guard" her phone. The inventive aspects may also provide for a user to be alerted of the locations of available public charging stations when the battery power level of his mobile device decreases to a low level. In particular, when the battery power of the mobile device decreases below a predetermined threshold level (for example, 20% of its maximum power), the mobile device may request, from the server, information of one or more registered businesses, i.e., any place of business that includes a charging unit, that house a charging station within a specified distance from the mobile device.

The disclosed system and method may also provide: advertising and differentiating opportunities for retailers; the ability for retailers to drive traffic to, and maintain traffic in, a store or stores; a mobile application, such as a mobile application that would indicate and/or suggest charging station locations, and/or that would monitor a user's use and the correspondent battery charge; and the like. For example, a user's time in-store in a retail establishment is likely to be increased as the user shops while awaiting a recharge. The user is also provided with a differentiated, enhanced customer shopping experience that increases consumer loyalty.

With reference to FIG. 1, GPS satellites (or other known mobile device locating technologies, such as triangulation) 100 operate to determine a location of a mobile device 104 that contains features, some of which features may be available based upon the location data. As used herein, mobile device 104 may refer to cellular phones, personal digital assistants, tablets, and the like. The mobile device 104 may determine its location through the use of received GPS signals, or through the use of a filter which may combine location data from the GPS signals and/or from another system, such as cell-tower-triangulation or a WLAN system in order to obtain a location or a more accurate location. The mobile device 104 may be wirelessly coupled to server 106. The server 106 may be communicatively coupled to a datastore 108, as well as to a plurality of charging stations 110.

According to certain embodiments of the present invention, the server 106 periodically receives and stores location information associated with the mobile device 104. This location information may be sent from the mobile device 104; pulled from the mobile device 104; or obtained from another service that is able to determine the location of the mobile device (e.g., Location Based Services (LBS), Assisted GPS (A-GPS), eGPS, GSM Localization, Multilaterilization, Radiolocation, Trilateration, etc.).

For example, many public areas may provide Wi-Fi access points that consumers are allowed to utilize. These access points may also be used to help ascertain the location of a user or his relation to publicly available charging stations. For example, a Skyhook Wireless system may be used. This location information may be analyzed independent of or in conjunction with other forms of information or location information. For example, Wi-Fi location information may be particularly useful in certain indoor environments where other technologies (e.g. GPS) may have more difficulty functioning, such as in a shopping mall housing a collection of retail businesses.

Embodiments of the present invention allow a mobile device user (who may become registered with the system upon using the charging station 110 for the first time) to be alerted of the locations of available public charging stations when the battery power level of his mobile device decreases, such as to a predetermined threshold level, which may be automatically set or which may be previously set by the user. Accordingly, when the battery power of the mobile device decreases below this predetermined threshold level (for example, 20% of its maximum power), the mobile device may request, from the server, information of one or more registered businesses housing a charging station within a specified distance from the mobile device. Alternatively, the location information of the mobile device may be sent to the server and compared with: the location information of one or more of the registered businesses housing a charging station; a list or a preferential list of registered businesses housing a charging station; a list of registered businesses having charging stations and making offers to consumers that those businesses wish to be known to the consumers; and the like.

By way of non-limiting example only, a mobile device user may be out in public, shopping. Becoming occupied with his shopping, the user may forget or neglect to check the battery power level of his mobile device. The system and method, according to embodiments of the present invention, may notify the user via his mobile device that the battery power of the device is indeed low, and then may display to the user a nearby store which houses a charging station, and that has a charging unit, such as a charging "locker," available. In an embodiment of the present invention, the mobile device app may display the number of charging lockers available so a user does not waste time going to a charging station that does not have any charging lockers available. By being timely notified by the mobile device associated with the disclosed system and method, the user may have enough time to locate and subsequently recharge his mobile device battery for continued use of his mobile device without having to cut short his shopping experience or risk losing operation of his mobile device. As a substantial benefit to a registered business housing the charging station, the business may experience increased consumer traffic, as potential consumers enter the business to recharge their phone, and the opportunity to make targeted enticements to consumers having a known location proximate to the registered business.

Figure 2:
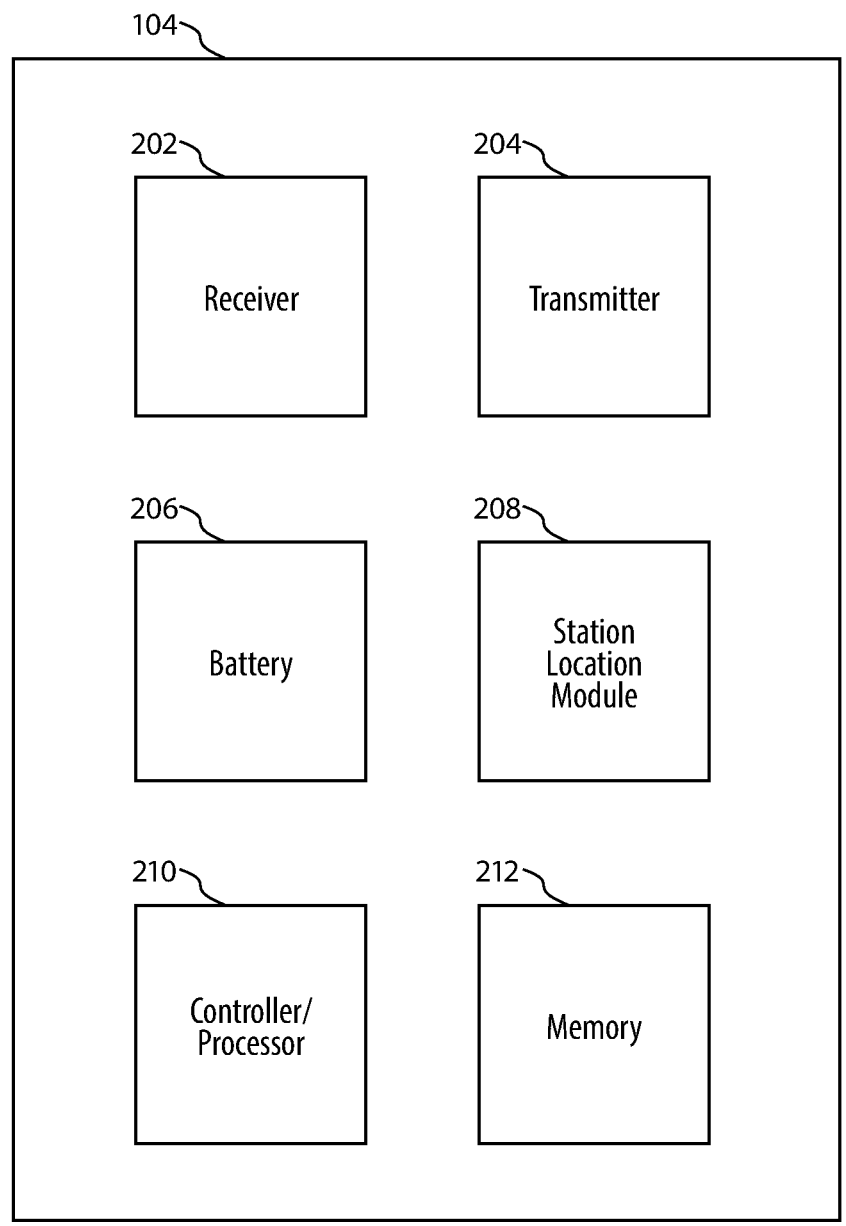
FIG. 2 illustrates a block diagram of a mobile device according to embodiments of the present invention.

FIG. 2 shows a block diagram of a mobile device 104 according to an embodiment. Within the mobile device 104, a receiver 202 may receive signals transmitted from GPS satellites, cell-towers, and/or access points for WLAN communication. A transmitter 204 may transmit signals including location information to the remote server or other access points. Power is provided to the various components of the mobile device 104 through battery 206. A station location module 208 may monitor a power level of the battery 206, and, based on the power level, the station location module 208 may provide station location information to the user of the mobile device 104. It should be noted that the station location module 208 may be able to monitor other functions and features of the mobile device as well. This information may be stored in one or more of databases described in datastore 108. The various modules within the mobile device 104 may operate as described hereinthroughout. A controller/processor 210 may direct the operation of various modules within mobile device 104, such as by execution of software program code to perform the functions discussed hereinthroughout. A memory 212 may store data and program codes for mobile device 104.

Figure 3:
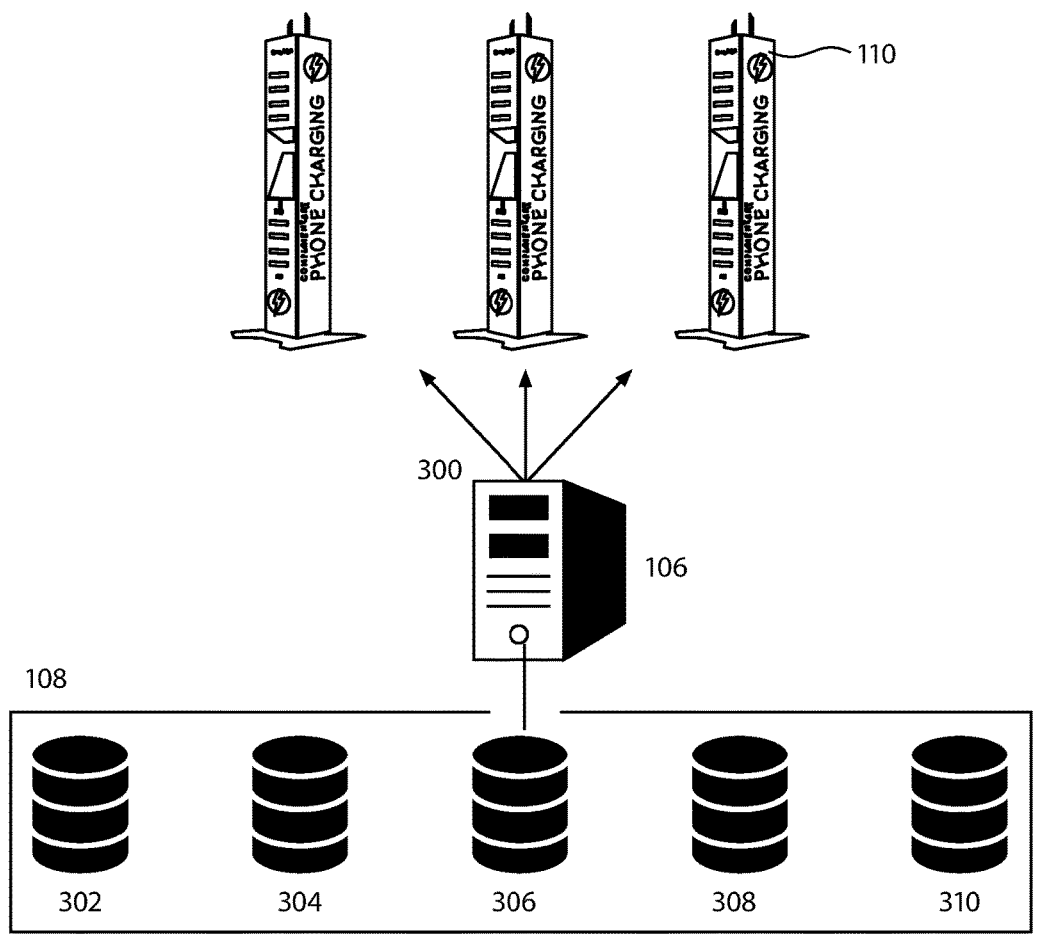
FIG. 3 illustrates a block diagram of a system according to embodiments of the present invention.

FIG. 3 shows a block diagram of a system 300 according to embodiments of the present invention. The system 300 comprises one or more charging stations 110, server 106 and data store 108. In certain embodiments of the present invention, the server 106 performs the tasks of providing charging station information to the mobile device. This charging station information may include geographical locations and/or directions to one or more respective charging stations and registered businesses in which these charging stations are housed or otherwise associated. This charging station information may also include advertisements or other types of information related to the associated businesses. This charging station information, among other types of information, is stored in one of the various databases 302-310 in data store 108. It should be noted that the various databases 302-310 shown in data store 108 may be organized as separate databases, portions of a single database, or by any other logical structure appropriate for storing the data.

Of course, the skilled artisan will appreciate, in light of the disclosure herein, that information and data may also be stored locally at a locker/kiosk/station. Thereby, a user may be enabled to obtain her phone even if power is lost or the network connection of the locker/station goes down. Moreover, in order to provide enhanced security in the instant invention, this locally stored information may be periodically purged, such as when a phone is obtained, or daily or weekly.

As illustrated in FIG. 3, data store 108 stores user information in user database 302. This information may include email addresses, phone numbers, survey responses, duration of charge, and the like.

A map database 304 may also be included. This database 304 may provide the background maps that are displayed on each user's mobile device and that correspond to an area or region around the user at the time the application is invoked (i.e., when the user's mobile device battery is low). For example, a map tile of the United States may provide an image of the continental U.S. that can be zoomed to display a regional street level map for any area in the U.S. The map may further be zoomed to display locations within a venue housing a collection of businesses. For example, a user may be located within a mall, and the application may be invoked due to his mobile device battery being low. The mobile device 104 may display locations of retail stores within the mall which house available charging stations to charge the user's mobile device, either upon zooming in on the application by the user, or by a predetermined setting for displaying a location.

A location database 306 may store geographic locations of charging stations and/or geographic locations of mobile devices 104. A charging station database 308 may store the current status of available lockers within any charging stations. This status may include a number of lockers of a particular charging station not currently in use, or, available, for charging. The data store 108 may also comprise a registered business database 310, which may store information related to businesses currently registered with the charging system according to embodiments of the present invention. For example, the business database 310 may include approved advertisements, or associated content describing respective registered businesses.

Figure 4A:
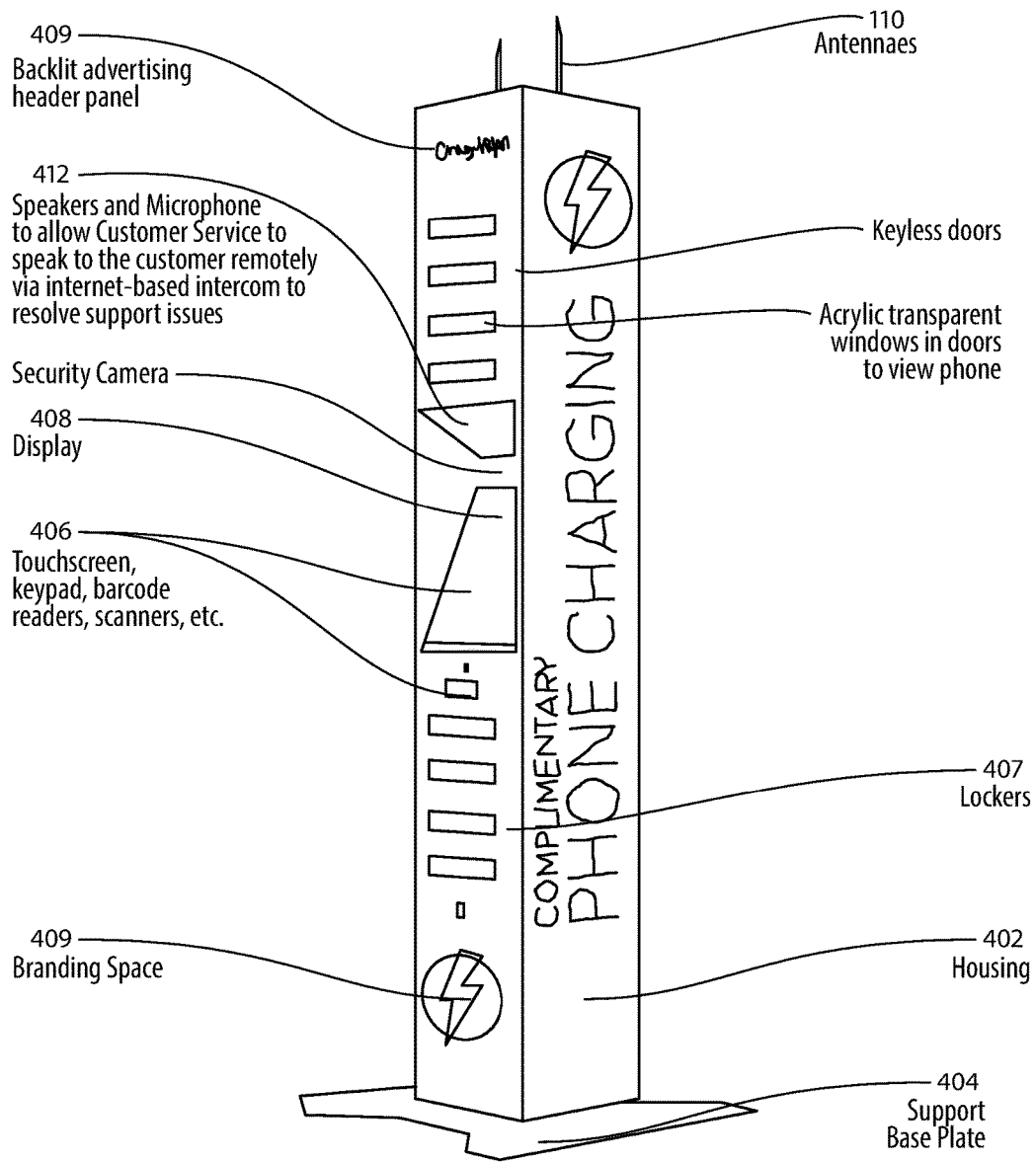
FIG. 4A illustrates an example of a mobile device charging station according to embodiments of the present invention.
Figure 4B:
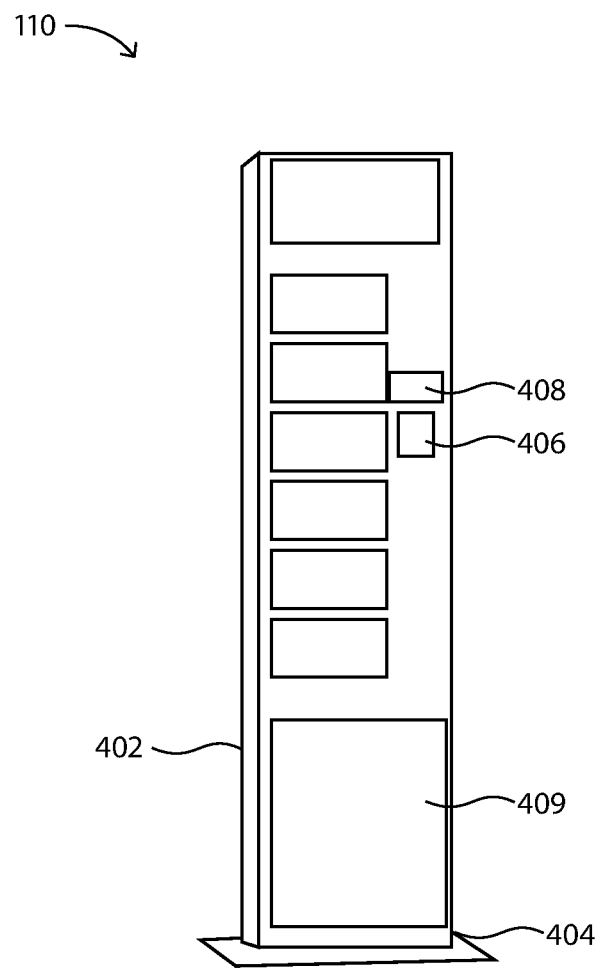
FIG. 4B illustrates another example of a mobile device charging station according to embodiments of the present invention.

FIG. 4A illustrates a mobile device charging station 110 according to embodiments of the present invention. This station 110 may be located in a retail store, mall, hospital, stadium, casino, building lobby, or any other location suitable for accessibility. In FIG. 4B, station 110 includes a housing 402 mounted on a support 404. Embodiments may also include, on a face of the charging station 110, branding space 409 for a registered business to provide information about its business, which may include, by non-limiting example, advertisements, coupons, or any other suitable content related to its business. Each housing 402 may comprise one or more lockers 407, preferably having resident therein supplied power, such as a plurality of charging cords or other wireless charging options, such as supplied power having different plugs, power mats, or like proprietary or third party charging formats for mating to different mobile devices, such as USB plugs, micro- and mini-USB plugs, laptop tip plugs, and/or one or more proprietary plugs, such as plugs for an iPhone 3, 4 or 5. Of course, any other charging plugs that presently exist or are subsequently developed may be included, as well as any other current or subsequent charging methodologies, such as charging mats, wireless charging, etc.

It should be understood that housing 402, support 404, locker 407, and branding space 409 may have any desired dimension or configuration, depending, at least in part, on the particular location of the station 110, and that the overall design of station 110 shown in FIG. 4 is for exemplary purposes only.

By way of example, charging stations may comprise eight lockers, each with multi-use charging cables, and/or multiple different charging cables, therewithin. The lockers may reside in a structure formed of a suitably durable composition, such as metal, acrylics, and combinations thereof. For example, the door of a charging locker may allow for the user to see inside the locker, but may be formed of an acrylic panel that can withstand forces up to or exceeding, by way of non-limiting example, 10,000 psi.

Of course, a durable cabinet construction may allow for usage in a variety of environments, and the durable construction may be formed accordingly, such as by metal treated with rust proofing. Moreover, the durable housing may house there within a variety of other features, such as antennas, PCBs, and the like, as referenced herein throughout. Alternatively, antennas may be placed atop, behind, or alongside in physical association with a cabinet. In preferred embodiments, the antennas may be suitable to communicate using any of a variety of different communication methodologies dependent upon the context in which the cabinet is placed, such as using 4G LTE, 3G, a wide area network, a local area network, or the like. Moreover, multiple different antennas may provide this functionality, where a single antenna may provide multiple different functionalities for communication purposes. Accordingly, and dependent in part on location, communication speeds may be optimized by software or firmware algorithms within the cabinet, or remotely by an administrator, by way of non-limiting example.

Additionally, in the event the lockers can be at least partially transparent to a user, other features may be added within each individual charging locker, such as multi-color LEDs, also as referenced herein. These additional features, such as LEDs, may be controlled locally or remotely, such as to provide optionality correspondent to time of year, i.e., Christmas lights, branding of the unit, whether or not a locker is in use (i.e., a red light may mean that locker is in use), and the like.

Different mechanisms may be mounted on or associated with the housing 402 to enable a user to access, lock, and subsequently unlock an individual locker 407 for charging his mobile device 104. For example, the locking mechanism associated with a charging locker, such as in order to provide optimal security, may be break proof, such as withstanding up to or in excess of 1,000 pounds of force before yielding. The different device entry and lock/unlock mechanisms may allow the system 300 to gather varying amounts of user information referred to above (which may be stored in user database 302).

Referring to FIG. 4A, another mechanism, such as a bar code scanner or card or key FOB reader, and/or a display 408, such as a touch screen display, and/or a keypad 406 mounted to the housing 402, may allow for the collection of more user information. Coupled with a display 408 and microcontroller (not shown) connected to an electronic, keylesslock (FIG. 4C 413), a user may be provided with instructions and options for charging his or her mobile device 104. For example, the locker 407 may be preprogrammed by the microcontroller (not shown) to accept a selected sequence or information entry by a new user when the electronic lock is unlatched (i.e. the locker 407 is open). The microcontroller (not shown) may be configured to accept the same sequence or information first entered by the user causing the lock to unlatch, allowing the user to remove his phone from the locker after use. This sequence or information may include user identifying information, such as the user's telephone number, key code, pin numbers, security questions, email addresses, selection of security images, scanning of a bar code (such as on a ticket provided by the kiosk to a user when the user placed the phone in the locker), etc.

The display 408 may thus prompt the user for other identifying information for the collection and subsequent storage of user shopping information which may be valuable to retailers/registered businesses. For example, the display 408 may prompt the user to enter his name, a telephone number, an email address, a name and/or telephone number in conjunction with other information, such as a security "pin" having 2, 3, 4, 5, 6 or more digits or such as a security image, a loyalty program identifier, or the like.

By way of example, upon actuation of keypad 406 or touch display 408, the display may prompt the user to enter his telephone number. It should be noted that other and/or additional user identifying information may be gathered as a part of these instructions. This gathered information may be used to serve several purposes. One purpose may be to provide verification information that the user is, indeed, who he says he is (such as by way of comparison to registered user information for system 300, by way of verification with information stored in the mobile application having associated therewith the aforementioned map and battery charge level capabilities, and/or by comparison with personal information on the mobile device, such as may be stored in association with the device's SIM card). Another purpose is to insure that only the user (or, an individual authorized by the user) is able to access the mobile device 104 from the locker 407 after the mobile device has been locked in the given locker 407. Yet further and as mentioned above, another purpose for the prompted user identifying information is to gather information about the user's shopping habits and/or frequented registered businesses, and/or other information as described hereinthroughout, which may be subsequently stored in user database 302 (as shown in FIG. 3).

Also, as a security feature, the display 408 may display an image of which a user has previously selected upon initially accessing an available locker. For example, the user may enter a telephone number, and then either select or be shown an image, such as a black dog. Upon returning to unlock the locker, the user may be prompted to enter his phone number, and then to select the appropriate image that matches the preselected image in order to unlock the locker.

It should be noted that any suitable type of user interface may be provided. For example, the user interface may be a part of a display 408, such as the aforementioned touch screen liquid crystal display (LCD), and/or may include a display and a separate or discrete keypad 406. Moreover, it should be noted that any known methodologies of data entry may be employed, alone or in combination, including but not limited to a credit card or driver's license swipe, telephone number or other data entry to a keypad, a bar code or QR code scan, a loyalty program card or informational scan, a near field communication scan, or a biometric scan, such as a fingerprint scan, for example.

In certain embodiments, upon entry of a telephone number, for example, the user may receive a SMS or MMS message (by way of non-limiting example) containing further information, as discussed throughout. For example, the user may receive promotional information, such as may be used upon reaching a business at which resides the charging units. The user may also receive a call to action, such as to download a mobile app, go to a website, enter a contest, receive a coupon, or the like. Of course, the present invention may employ known technologies to track responses to such calls to action.

An exemplary auxiliary mechanism which may be employed for accessing and using the charging station 110, and/or for accumulating additional user information or security, is a supplemental aspect of user interface 408, such as a card reader (not shown). The card reader (not shown) may accept any card identifying a particular mobile device user. The card reader (not shown) may be configured to accept a user credit card, a driver's license, or a consumer card issued by a particular retailer or establishment, such as a loyalty card, by way of non-limiting example.

For example, users may choose to enroll in user loyalty programs using the disclosed embodiments, either of the kiosk provider or of other commercial entities, or users may already be members of loyalty programs prior to using a kiosk. Users may choose to enroll via the charging kiosk utilizing a graphical user interface 408 provided at the kiosk, or may be enrolled in third party or affiliated programs that provide cards, pins, QR codes, or the like, to indicate loyalty status. The loyalty program enrollment information may be stored in conjunction with the user information stored at the administration server, or the like, or may be uploaded or otherwise made available from a third party for association, such as in a database, with a charging device number at the kiosk (noting that the kiosk may include the aforementioned auxiliary reader for loyalty cards, loyalty pins or QR codes, or the like). Further, via the graphical user interface, a user of the system may participate in completing surveys or polls, which may or may not relate to the loyalty program. For example, users may be polled, such as by a casino, as to, if they were to win a prize from a slot machine, what prize would they like to win.

In certain embodiments, and such in order to use the free charging service, the user may be asked to complete one or more surveys on the touchscreen. For example, a survey may be presented to the user on behalf of a single or multiple sponsors/clients/kiosk providers who are paying to receive customer information in exchange for value, such as in exchange for a location providing charging kiosk access to its customer base. By way of nonlimiting example, the location or venue may thereby have access to the charging station at no charge or reduced charge.

In a survey, the user may be asked a series of questions (up to 20, by way of non-limiting example) in exchange for having access to a free phone charge. The survey may be configurable, optional or mandatory in the system. For example, users may have the option to take the survey after they lock up their phone (and/or close the door), or users may be presented the survey when they come back to get their phone after they enter their mobile number and security credentials. Moreover, there may or may not be a limit on the number of times that the same user can take a specific survey, for example. Yet further, multiple surveys may be available on the same kiosk, and may or may not be offered to some or the same users on subsequent visits. That is, some users, or the same user on a subsequent visit, may receive different surveys or no survey at all. It will also be appreciated by the skilled artisan that the user would always have the ability to opt-out of the survey by choosing not to charge their phone.

The survey data may be appended to kiosk provider databases and/or clients'/sponsors' databases, such as to create a richer customer profile and/or to accumulate market research. Accordingly, survey questions may include demographic information such as gender, race, income level and the like, and/or may also include lifestyle preferences such as hobbies, favorite travel destinations, shopping locations and the like.

This enriched profile and/or enhanced market research may enhance the adoption of kiosks by location providers. For example, a mall customer presently paying a monthly fee for 1 kiosk may expand to 4 kiosks because the additional kiosk costs are partially or fully paid for by the survey provider.

In preferred embodiments, card reading or bar code scanning associated with the kiosk may be for identification and/or data accumulation purposes, and may or may not be for the purposes of charging the user a fee for usage of the charging station. For example, the card reader (not shown) may comprise a magnetic card reader, which, upon swiping the user's card on the reader (not shown), may read the information contained on a magnetic stripe located on the user's card, enabling the charging station to gather and process user identification information, such as for secure access by the user to his device after charging, and/or to accumulate information about the user, such as shopping habits of the user, which, as mentioned above, may be stored by user database 302.

Furthermore, data gained through the use of the method and system of the present invention may be associated with the additional or auxiliary data, such as from the aforementioned card reader. The card reader may allow for a user to use a free or discounted pass, a frequent users' card, a loyalty card associated with a kiosk sponsor, or the like. Accordingly, a large variety of data may be captured and associated with the auxiliary informational items, such as the cell phone number of the user, etc. Such data may include durations at particular locations, such as restaurants or retail, typical charging start times, typical charging end times, most frequently used kiosks, most frequently used lockers, percent capacity of usage, frequently used charging types and correspondingly phone types, or the like. By way of example, the control board discussed herein may receive information about which charging cable is in use in each locker, and may thereby receive information about what type of phone is charging or what type of phone is associated with a particular phone number. This may allow, such as in conjunction with loyalty information of, for example, a casino loyalty program, for the inference of demographic or social information, such as in relation to a particular retail establishment, or the like.

Figure 4C:
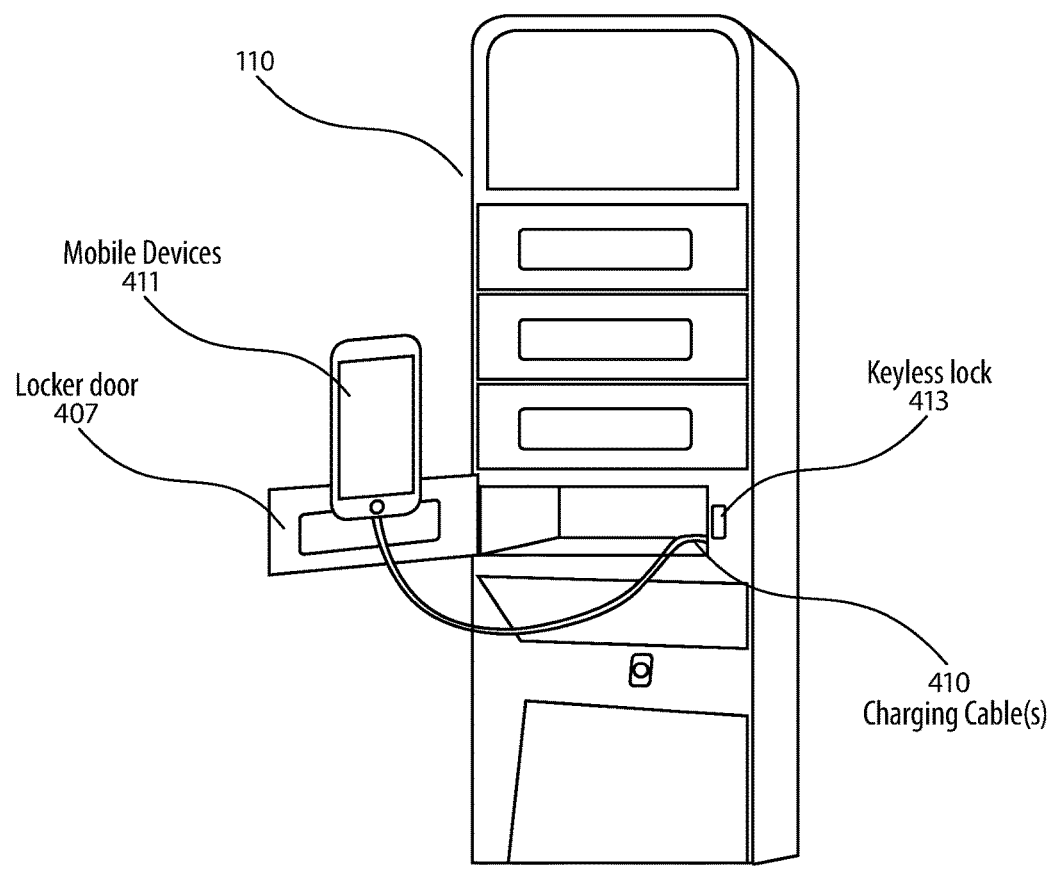
FIG. 4C illustrates an example of an open locker of a mobile device charging station according to embodiments of the present invention.

FIG. 4C illustrates an example of an open locker of the charging station 110 of an embodiment of the present invention. As shown, multiple interfaces and/or universal interfaces 410 may be located inside each locker 407 provided for recharging a given mobile device 411. Each interface 410 may be a unique type of charging interface, may be dedicated for a particular make or model of mobile device, or may be a universal charging interface.

Figure 4D:
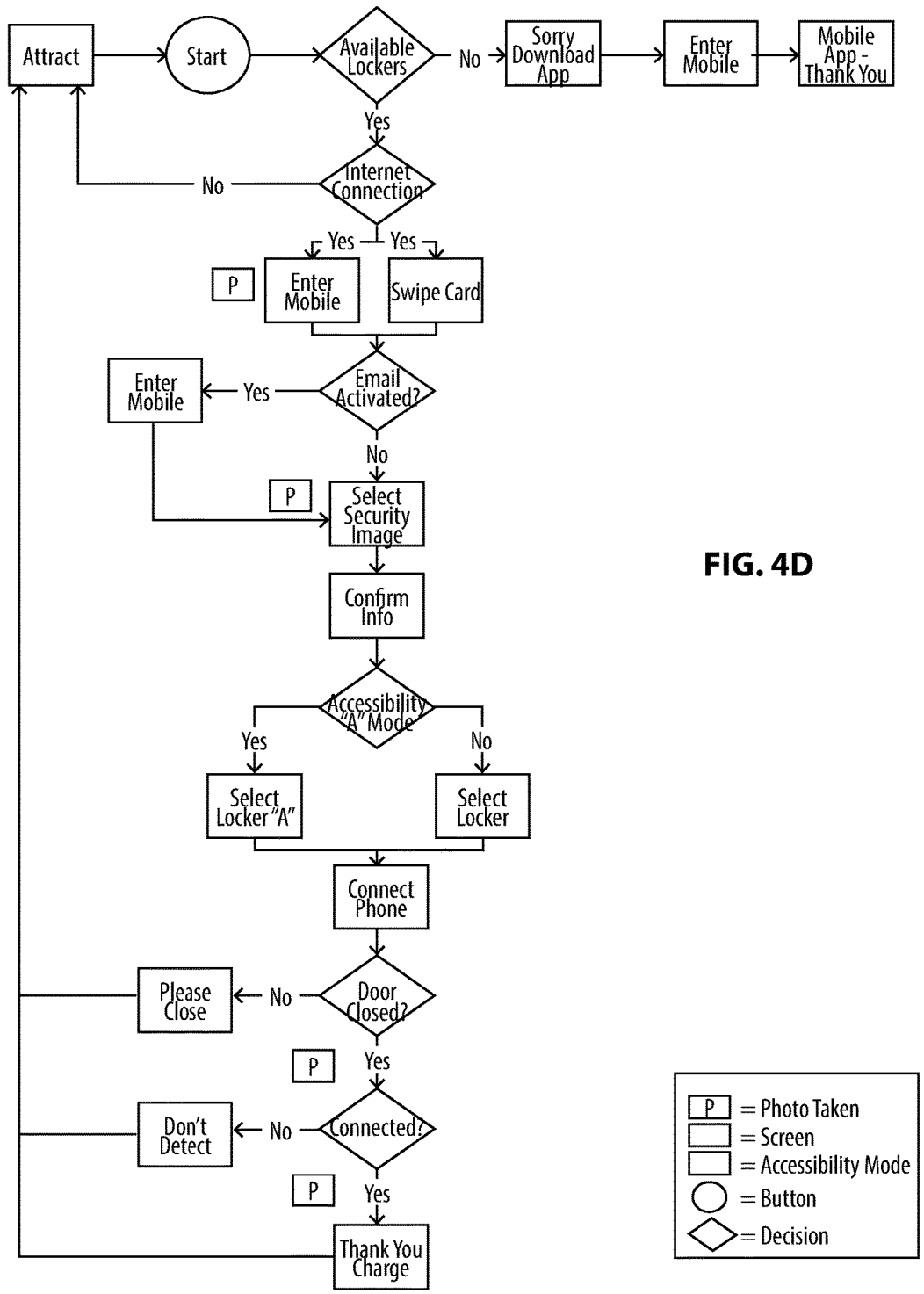
FIGS. 4D-4F are flow diagrams illustrating the use of an exemplary charging station.
Figure 4E:
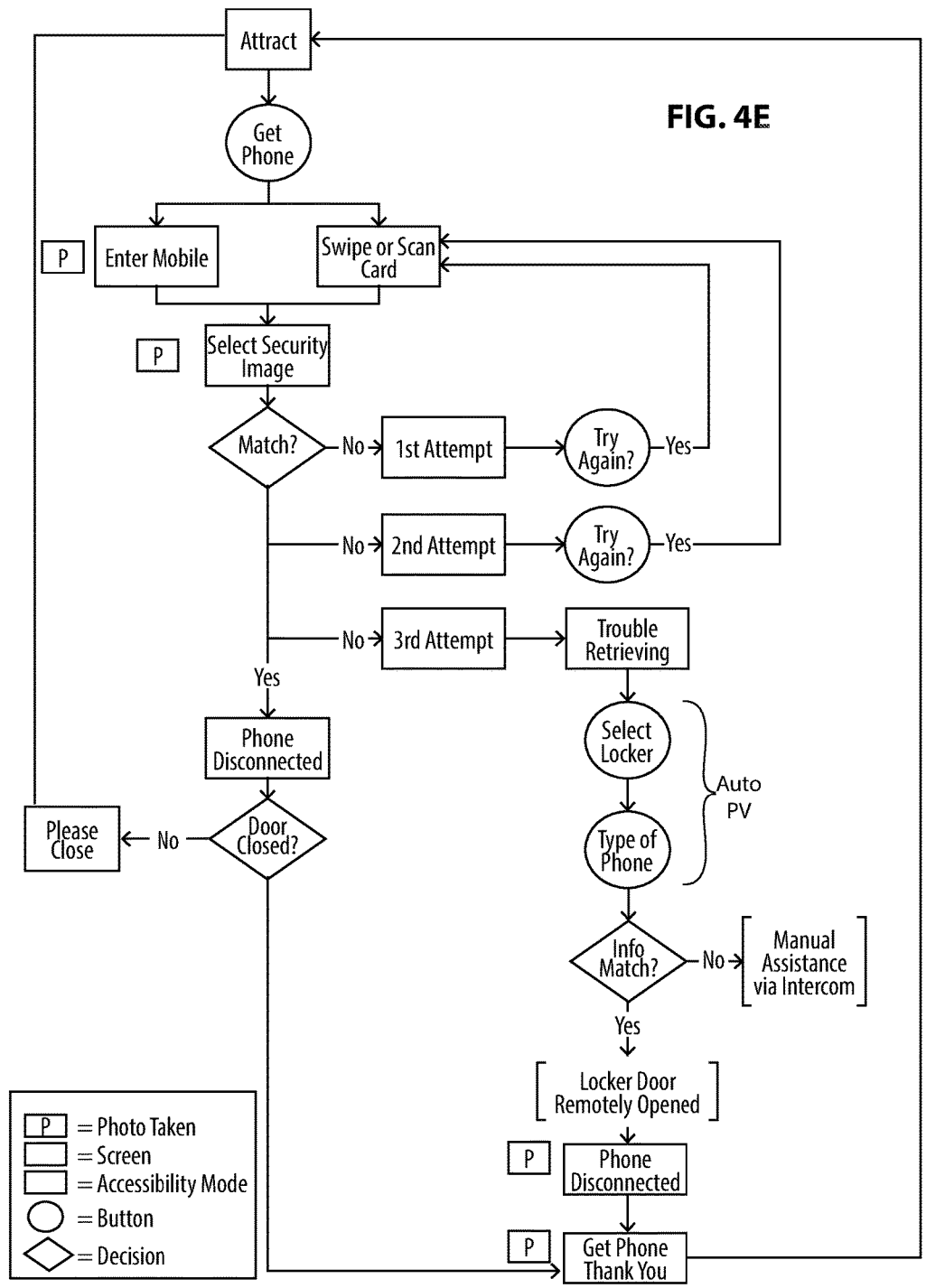
Figure 4F:
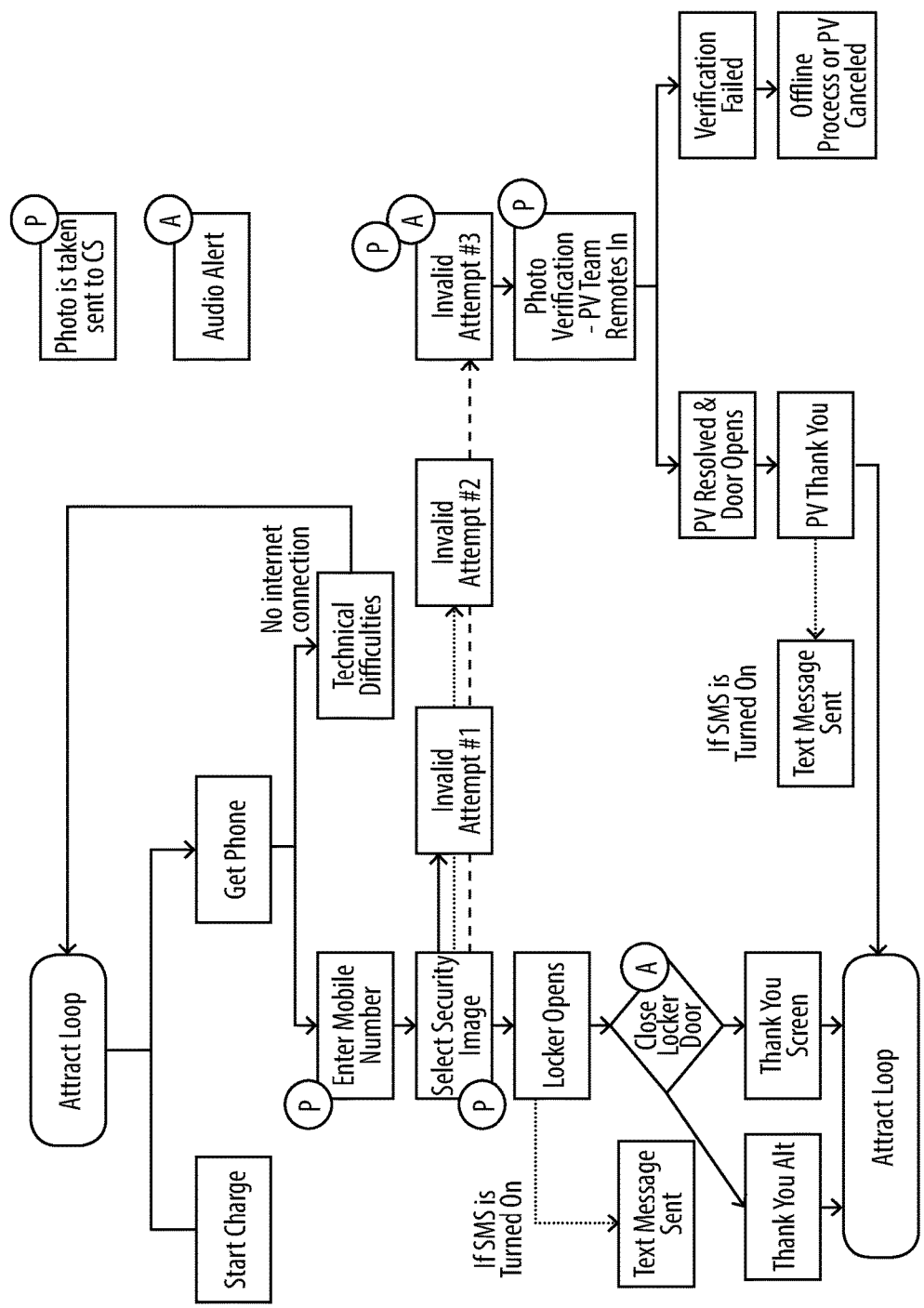

In at least one embodiment, in reference to FIGS. 4D and 4E, there is provided a PhotoVerification process of a user of the system (i.e. kiosk). As used herein, PhotoVerification is a process whereby a customer photo or similar biometric (such as facial recognition, fingerprint, retinal scan, voice recognition, etc.) is taken at the inception of a charging session, and wherein, when a user attempts to retrieve the charged device, the photo/biometric is compared, such as automatically or manually, to the biometric at inception in order to decide whether to release the charged device.

If a user's initial or subsequent security credentials are incorrect (i.e. "First Attempt Incorrect," "Second Attempt Incorrect", etc.), then the kiosk may automatically or manually "escalate" the retrieval security. For example, the kiosk may use a series of photos and/or a cellular, landline, and/or Voice over IP conversation directly with the user (such as by a customer service representative) to manually and/or via facial recognition software verify the user's identity ("Please Wait, We Are Using Surveillance Records To Verify Your Identity"). If a match is determined to be made ("Match Verified?"), either via manual or automated check, then the user may receive a success screen and the process continues to FIG. 4G. If a match is not made, then the process may proceed to an Offline process, a more extensive customer service interaction, or locked state, until a successful verification (photo or otherwise) or a manual unlock process is performed. If the customer service representative does not respond within a specified period of time, the PhotoVerification will timeout, thereby making the kiosk available for use by another customer.

FIG. 4H is a flow diagram illustrating combinations of the foregoing aspects. In short, the flow diagram illustrates various methodologies whereby a charged device may be obtained by the owner of the device, including the use of a PhotoVerification in the event of a lockout from a locker.

The kiosk may include various other hardware and/or software and/or firmware under the control of the kiosk control board referenced herein, and which may be employed in conjunction with the PhotoVerification process. By way of example, the kiosk may include the user interaction screen discussed herein, such as a touch screen akin to those employed at automated teller machines, as well as a camera proximate to, such as above, the user interaction screen, under the control of a control board. Accordingly, a user's first interaction with the kiosk may be with the screen while standing in front of the camera, thereby the camera may take a series of images, video, audio, or the like, of the user placing the phone into a locker and/or interacting with the screen.

Confirmation of user identity, for example, may occur via remote access to the server, such as with the kiosk initiating all requests to the server. In short, this provides a security feature in that the server cannot push information to the kiosk, but rather the kiosk periodically "pings" the server for information.

Thus, confirmation may be available at a later point, such as via the camera, that the same user is attempting to retrieve the phone as had initially placed the phone into the locker. In this manner, by way of non-limiting example, a user who has been locked out from retrieving his or her phone may be able to readily confirm with customer service that he or she should be able to retrieve the phone. Upon such confirmation using, at least in part, the camera, a remote customer service representative may, for example, open a locker, ask security questions, or the like.

This security may be enhanced by any known method. For example, security may be enhanced by allowing a user to pick, such as on the aforementioned screen, a secondary security image that the user may have to reselect as a security measure, or security measures may include PIN codes or the like in association with the user having entered his or her phone number in order to access the kiosk in the first instance. Moreover, the use of security images may additionally provide a branding or advertising opportunity, such as wherein various security images are provided to a user to select from that are representative of endorsers of the brand with which the kiosk is branded.

Once the user has entered the phone number and any required additional information, such as an email address, the user selects a charging locker and it is then opened, the screen may prompt the user to connect his or her phone for charging. An exemplary flow of the inception of device charging is illustrated in FIG. 4I, and may include ADA compliance in the form of making available lower level lockers for persons in need of such service.

Further and as referenced herein, once the phone is plugged in for charging, an optimal charging profile may be sought, and such an optimal charging profile may include charging rates, such as whether high level charging should be an initial occurrence, or should be ramped to slowly, and additionally the proper rate of ramp down of charging for optimal charging of a particular device as discussed herein. This provision of the charging profile may occur by the offering, by the kiosk, of various charging profiles until a profile is accepted by the device. Accordingly, although there is no synchronization with the phone, the optimal charging profile may nevertheless be obtained. The lack of synchronization in the disclosed embodiments is yet an additional security feature.

As referenced, customer service may preferably be available by the user screen, microphone and/or speakers as shown in FIG. 4 412, associated with the kiosk. This customer service may allow for a user to indicate a problem with the kiosk, such as the user being locked out of retrieving his or her phone. In exemplary embodiments discussed herein, customer service may have a variety of methods through which to confirm the propriety of the user's attempt to access the phone, such as via the customer service representative looking at pictures taken by the camera when the phone was placed in a locker, an assessment of the phone number entered or any security images or PIN numbers selected or provided by the users, charging tip type, or a series of questions asked of the user for security purposes. Such questions may include, for example, the approximate time the phone was placed in a locker, the phone number of the phone associated with the particular locker for which access is requested, and the ability to contact local security personnel if a user fails to properly address security when trying to retrieve a phone. Furthermore, customer service may have a variety of abilities, such as may be provided by the network infrastructure and the kiosk control board, to remotely access features of the kiosk. For example, a customer service may be able to open locks and/or otherwise open lockers, change lights, force onto the user screen certain information, or the like. Moreover, customer service representatives may have particular controls available to them in relation to the aforementioned photo verification period. For example, a customer service representative may be able to take a photo on demand of a user for comparison to earlier photos. He or she may be able to indicate to the user to please take off a hat, for example, to improve the ability to compare photos, may position a user in relation to the camera to provide for a best comparison of photos, or the like.

Customer service representatives may additionally have access to a variety of information in relation to the kiosk, such as usage, lockers then in use, phone numbers associated with locker, pictures taken by a camera associated with the kiosk going back in time, or the like. Much of this same information, and additional information, may preferably be available to kiosk administrators, who may oversee operation of one, multiple, or many kiosks, such as associated with a given geographic location, a given brand's campaign, a particular data type, or the like. Such administrators may be provided with a dashboard that yields real time access across a network of kiosks, which may include all kiosks or particular portions of kiosks. Using this dashboard, an administrator may be able to investigate all actions over configurable time periods, may be able to order maintenance, may be able to oversee customer service, or the like.

In further embodiments of the invention, photo or video records of users may be stored remotely, such as on an administration server which may be accessed by the customer service or administrator during the PhotoVerification process set forth herein. The administration server securely stores the user records and makes the user records available on an as-needed basis utilizing secure communication lines. The processing power of a centrally located admin server is considered far greater than the processing power of the charging station, or kiosk, therefore the verification process time is much quicker and results in improved overall user satisfaction. Moreover, security is enhanced by the Photo-Verification process, such as because the subject data remains firewalled.

In the event that a secure connection cannot be established with the administration server (i.e. an Internet connection is down), the authentication process for PhotoVerification may be halted and a user might thus be prevented from initiating the charge phone process, or from retrieving a device if they forgot their mobile number and security credentials. However, if the user correctly enters their mobile number and security credentials while the kiosk is offline, since the information is stored locally on the kiosk for a short amount of time, the user would still be able to retrieve their phone.

Once a device is connected to the charging cable, charging pad, or other wireless method of charging, the charging process may begin. A charging negotiation process may be undertaken, such as at the direction of control board associated with the charging station. The one or more printed circuit boards may provide local hardware interaction and control for various features of the cabinet. By way of example, such as in an eight-locker embodiment, two locker control boards may be provided—one for the upper four lockers control, the other for the lower four lockers control. This provision of multiple locker control boards may allow for a failsafe in the event one locker fails, i.e., the cabinet can continue to operate with the remaining lockers, or may correspond to different uses administratively prescribed to various parts of the cabinet, such as in embodiments where only the lower four cabinets are available for charging if the user requests accessibility mode for use of the cabinet.

More specifically, devices using the offered connectors may be sensed when connected, and may be offered a sequence of charging profiles to identify the most efficient charging standard for the device. In no circumstance is data ever transferred between the kiosk and the device in this negotiation.

By way of example of this negotiation, devices being charged may vary the amount of current drawn depending on their battery level. That is, nearly empty devices may draw more current than partially charged devices. A kiosk may ultimately supply 2.1 A or more to one or all lockers simultaneously.

By way of additional example, because the Americans with Disabilities Act may necessitate that only those lockers that can be readily physically accessed by a user may be selected and opened by that user, selection of an ADA accessibility mode on the user screen may indicate to the control board that only the lower lockers, such as lockers five through eight in an eight-locker example, may be opened for a particular user. In addition, all buttons on the touchscreen interface are ADA compliant.

The control board may also provide various other functionality, such as charging control, kiosk remote interaction, direct on-board control of the LEDs or added features, control of the user interaction screen and cameras, and so on. The board may additionally have software or firmware resident thereon that provides optimization functionality, such as by interaction through the aforementioned charging cables. By way of non-limiting example, the board may be comprised of firmware that controls the offered charging profile to the connected phone, and the phone accepts its optimal profile.

As a non-limiting example, the charging board may be preprogrammed with information pertinent to various charging profiles, or may retrieve the information from an external server. Based on this information, the charging process can provide the optimal amount of current to best charge the phone in the shortest amount of time.

More specifically, the optimized charging process may be provided by the board, as discussed throughout. In sum, the disclosed exemplary embodiments provide that a phone may accept only the highest amperage for charging that the phone can handle without degradation. Accordingly, under the control of the aforementioned control board, the kiosk charging cables in the exemplary embodiments may offer various power profiles to the phone and allow the phone to draw optimally at a particular power profile, thereby indicating that power profile to be the proper one for optimal charging of the phone. The optimal charging process may include limitations, such as the preclusion of rapid charging even for a phone that will accept a rapid charge, such as in order to avoid damage to the phone.

Moreover, available optimal charging profiles provided by the kiosk control board may include a default profile, such as the lowest charging profile acceptable to all phones, i.e., a laptop phone charging profile of 500 mA. Thereby, the phone may be optimally charged without any access by the kiosk to the phone itself or any information, including the data, resident thereon.

Moreover, during or following charging, the invention may provide a notification process. The notification process may be initiated at discreet events such as upon start charge, upon the completion of a device being charged fully, etc.

Users may be notified in a myriad of different ways, including, but not limited to, SMS text message, an email, or the like.

Further, once placed in a locker, the phone may remain in a locker for an unlimited period of time or for a predetermined allowable period of time. Moreover, charging in association with particular phone numbers may allow for tracking not only of time of use and location of use for an individual user, but additionally if no use occurs over a period of time. For example, if a user has not charged in 30 days, a text may be sent to the user's phone advertising a particular business previously frequented by the user at which the user charged at a kiosk, from a brand, from a kiosk sponsor, from a particular kiosk location, or the like. The user may be additionally provided with an advertisement, a coupon, a suggested app download, or the like, if the user fits certain use criteria, time of use criteria, or time without use criteria.

Figure 5A:
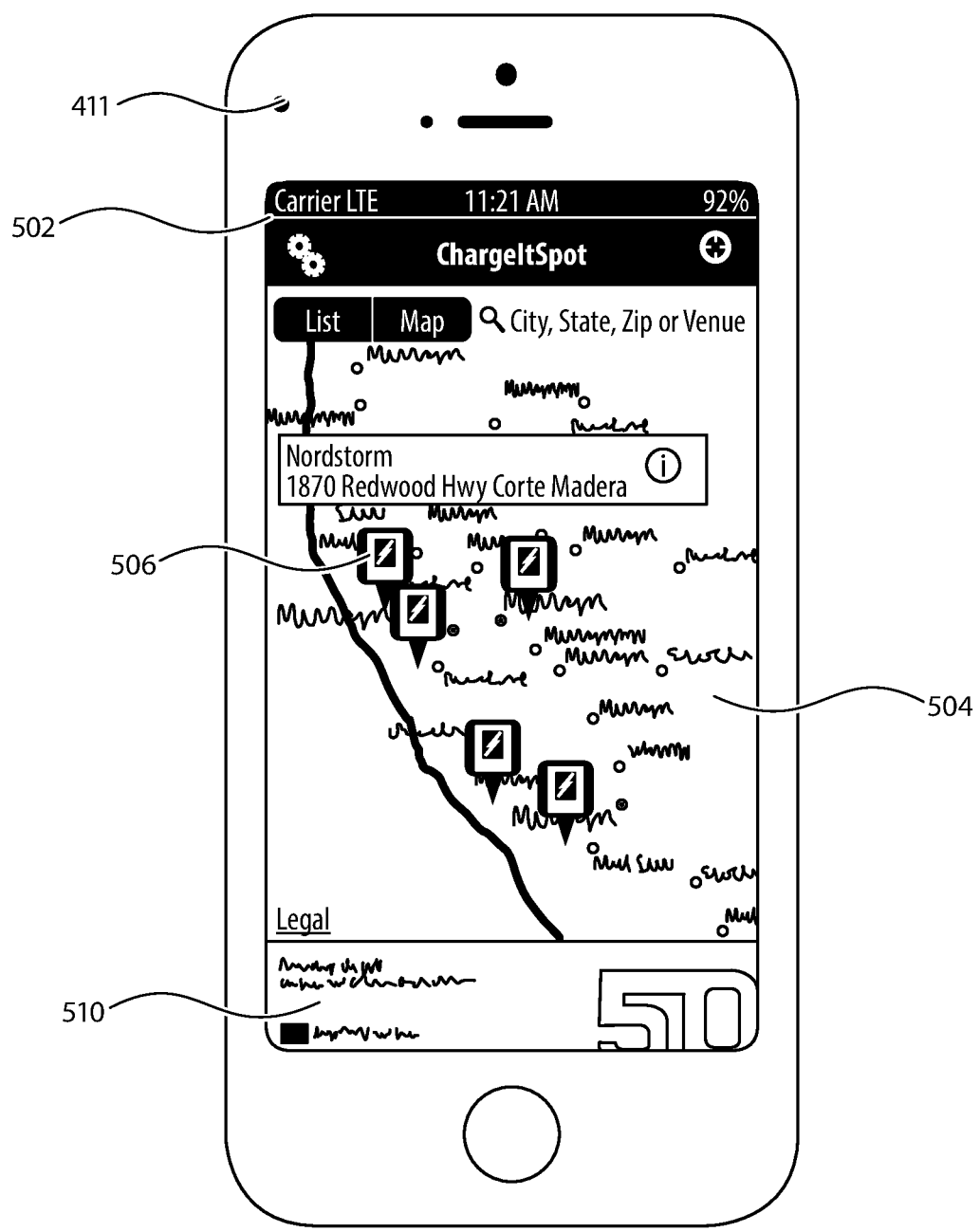
FIGS. 5A-E illustrate exemplary map displays on a mobile device according to embodiments of the present invention.
Figure 5B:
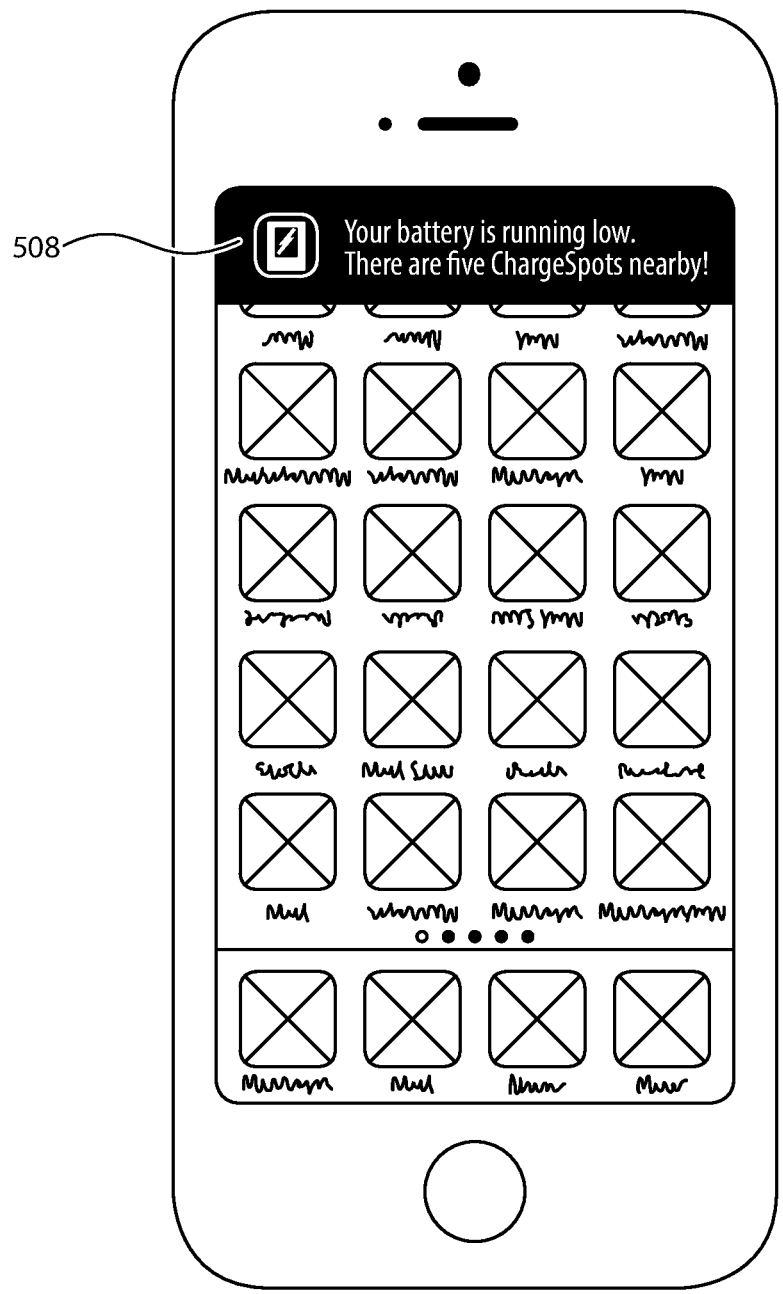

FIGS. 5A and 5B illustrate examples of a map displayed on a mobile device, such as by a mobile application associated with the disclosed systems and methods. As shown in FIG. 5A, for example, the mobile device has a display screen 502. The server (not shown) may access the mobile application on the device, such as upon sensing by the mobile application on-board that battery power has fallen below the predetermined threshold, and may cause the display of a map 504, a notification (such as to allow for subsequent display of a map), or a like-alert on the display screen 502, such as to indicate the need for charging, and/or to recommend prospective charging kiosks.

Of course, the skilled artisan will appreciate that an assessment of user location in relation to a low battery threshold may vary by device/platform type. By way of non-limiting example:

```
Android Battery Low Notification Algorithm
==================================
Android OS notifies application battery level has changed
IF battery Level <= minimum charge THEN
    Find current device location
    FOR EACH CIS location DO
        IF CIS location latitude and longitude are set THEN
            compute distance to CIS location from current device
            location
        END IF
    DONE
    Sort CIS locations by distance from current device location
    Take nearest CIS location
    IF nearest CIS location distance < maximum distance THEN
        Show low battery notification dialog
    END IF
END IF
iOS Battery Low Notification Algorithm
==================================
iOS notifies application that location region has changed
IF battery Level <= minimum charge THEN
    FOR EACH CIS location DO
        IF CIS location latitude and longitude are set THEN
            compute distance to CIS location from current device
            location
        END IF
    DONE
    Sort locations by distance from current location
    Take nearest location
    IF nearest location distance <= maximum distance THEN
        Show low battery notification dialog
    END IF
END IF
```

The map may populate with certain icons 506 superimposed thereon, such as for denoting the location of certain available charging stations and/or registered businesses having charging stations to the user, and/or how many charging units are available (if any) at a given location, such as responsive to a push notification to a low-battery device, or such as responsive to a user search (such as by proximity, venue, city, state, zip code, etc.). By way of non-limiting example only, a large upside-down "teardrop" icon may denote the location of a charging station 110 with at least one locker currently available for charging. Also displayed on the display screen 502 may be a notification area 508 as shown in FIG. 5B. in which the mobile application may notify the user that his battery power level has decreased to a predetermined level, and that the battery may need to be recharged soon to maintain operation of the mobile device. As shown, the notification area 508 may be located above the map, by way of nonlimiting example.

Figure 5C:
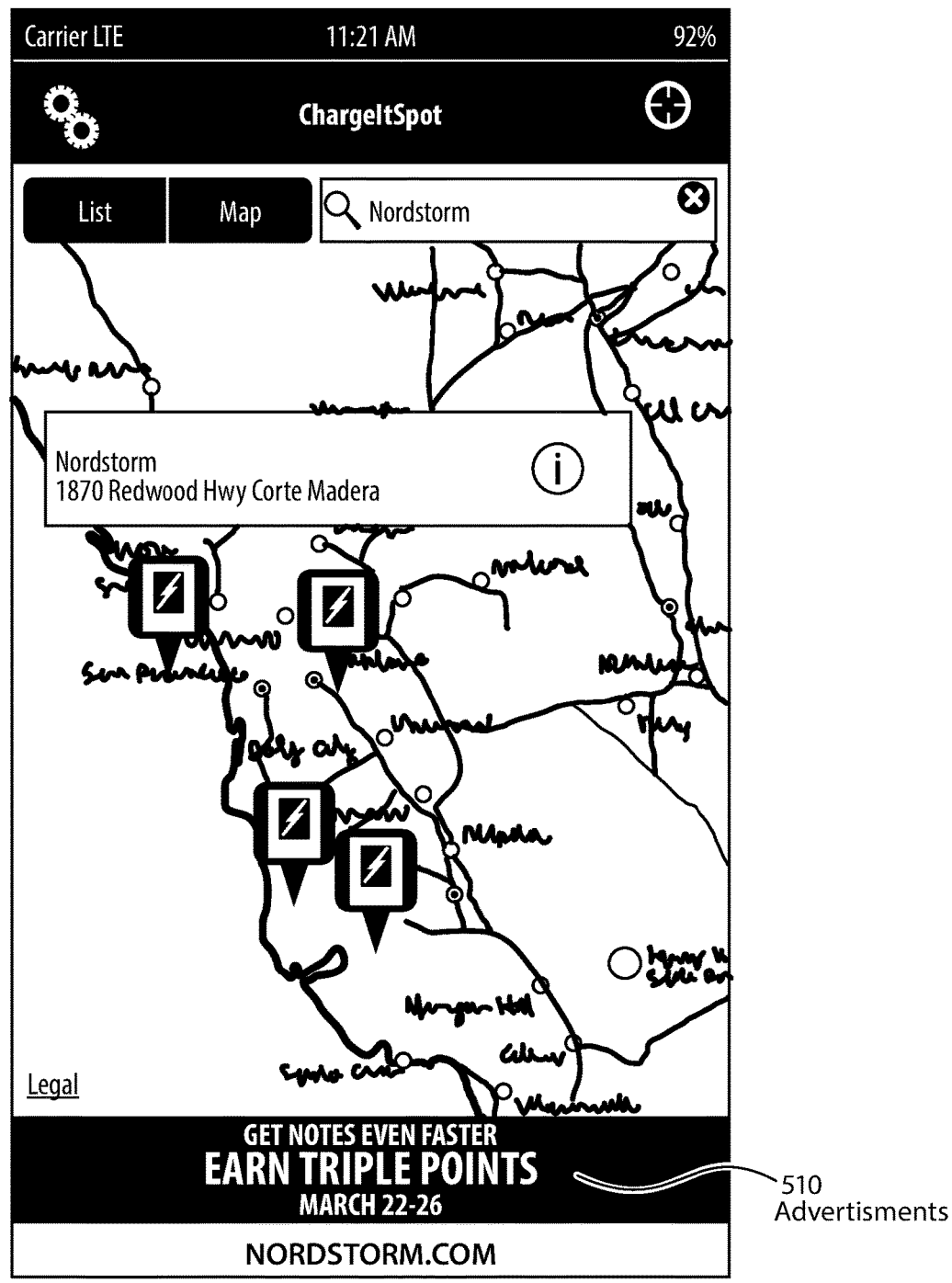

However, embodiments of the present invention are not so limited, as the notification area 508 and/or map may be of any known type, may be tiled or "windowed" in any manner, and/or may be located anywhere on the display screen 502. In an embodiment of the present invention, as illustrated in FIG. 5C, the user may toggle between the map view discussed herein and/or a list view of location which may more clearly identify the most convenient location for the user. Such a list view may, for example, note the distance between the user and the provided locations and may be sorted, for example, from closest to furthest from the user geographically. Similarly, using traffic reporting systems known to those skilled in the art, the sorting may also account for travel time due to road conditions and may sort accordingly.

Further, the configurability of the user presentation in the instant embodiments may include that the user can configure the battery percentage level that triggers a low battery notification, and/or the distance to the closest charging station in order for an alert to be delivered, by way of non-limiting example.

As further illustrated in FIG. 5C, 510 ads may be served within aspects of the GUI and may, for example, be served along with the list of possible charging locations. In an embodiment of the present invention, the served ad may be in the form of a banner ad. The served ad may be used to self-promote features and services provided by the present invention and/or may be sold to third parties. Third party ads may be associated with one or more identified locations and may pertain to that location's particular goods/services offered for sale. For example, a location having a charging station 110 may be predominately in the business of selling shoes, and, more particularly, athletic shoes, and may pay for the delivery of an ad promoting its business and/or offering a coupon for the purchase of shoes. Such a promotion may, for example, offer an additional discount/incentive based on use of the charging station 110.

Further, as referenced herein, once the app is downloaded to the user's phone, information can be readily provided to the user associated with that phone number, such as the pushing not only of ads, but also of data, an app, or the like. Moreover, an app associated with the instant invention, the screen of the charging kiosk, or simple text message may request information from one or more users, wherein that information is desired or needed by locations, sponsors, or the like. For example, email addresses may be requested, such as an association with a retail embodiment and in order to correspond to a particular phone number. Thereby, that retail establishment may develop data regarding phone numbers and matched email addresses of frequent shoppers at that establishment, whereby coupons, advertisements, or the like may be provided to that frequent shopper.

As would be appreciated by those skilled in the art, ads may also be delivered based on location and may be dynamically delivered based in user attributes. For example, an ad may be served according to the proximate of a user to a location where the ad may be relevant, whether or not the relevant location and/or ad is related to a charging station 110 location. Similarly, an ad may be served based on the type of phone used by the user and/or the apps loaded thereon or browsing history. For example, the app of the present invention may query the bookmarks or other internet browsing activity logged on the user device and may use that information when serving an ad.

As would be appreciated by those skilled in the art, ads may be scheduled with a start and end date over a specific time period. The use of revolving and/or multiple ads may be presented to a user and may, for example, create a user specific "playlist". Such ads may be configured as an attribute in any of various available programs known to the skilled artisan.

Figure 5D:
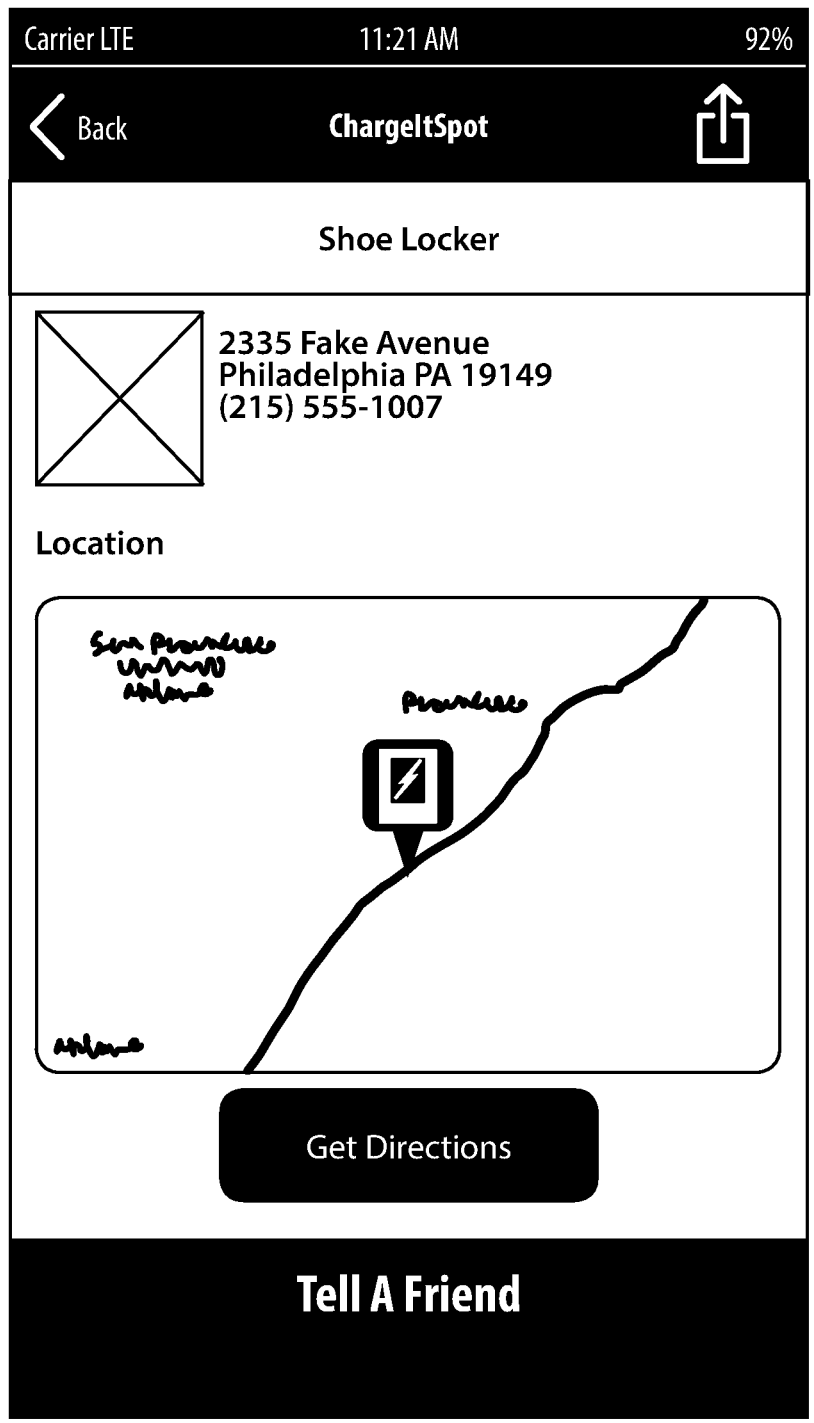

Any selection of a location, whether by selection of a graphically presented location, a listed location name, and/or automatically delivered to the user, may include a detailed map representation and/or the option to obtain directions to the selected location, as illustrated in FIG. 5D. Information provided may also include location details, including contact information, and may allow for the sharing of the location information with other contacts through conventional communication means, such as email and texting, for example, and through social networks, such as Facebook, for example. As would be appreciated by those skilled in the art, obtaining directions to the selected location may include launching a GPS aided mapping app which may be resident on the user device, such as, for example, MapQuest or Google Maps, which may give "turn-by-turn" directions to the user.

Figure 5E:
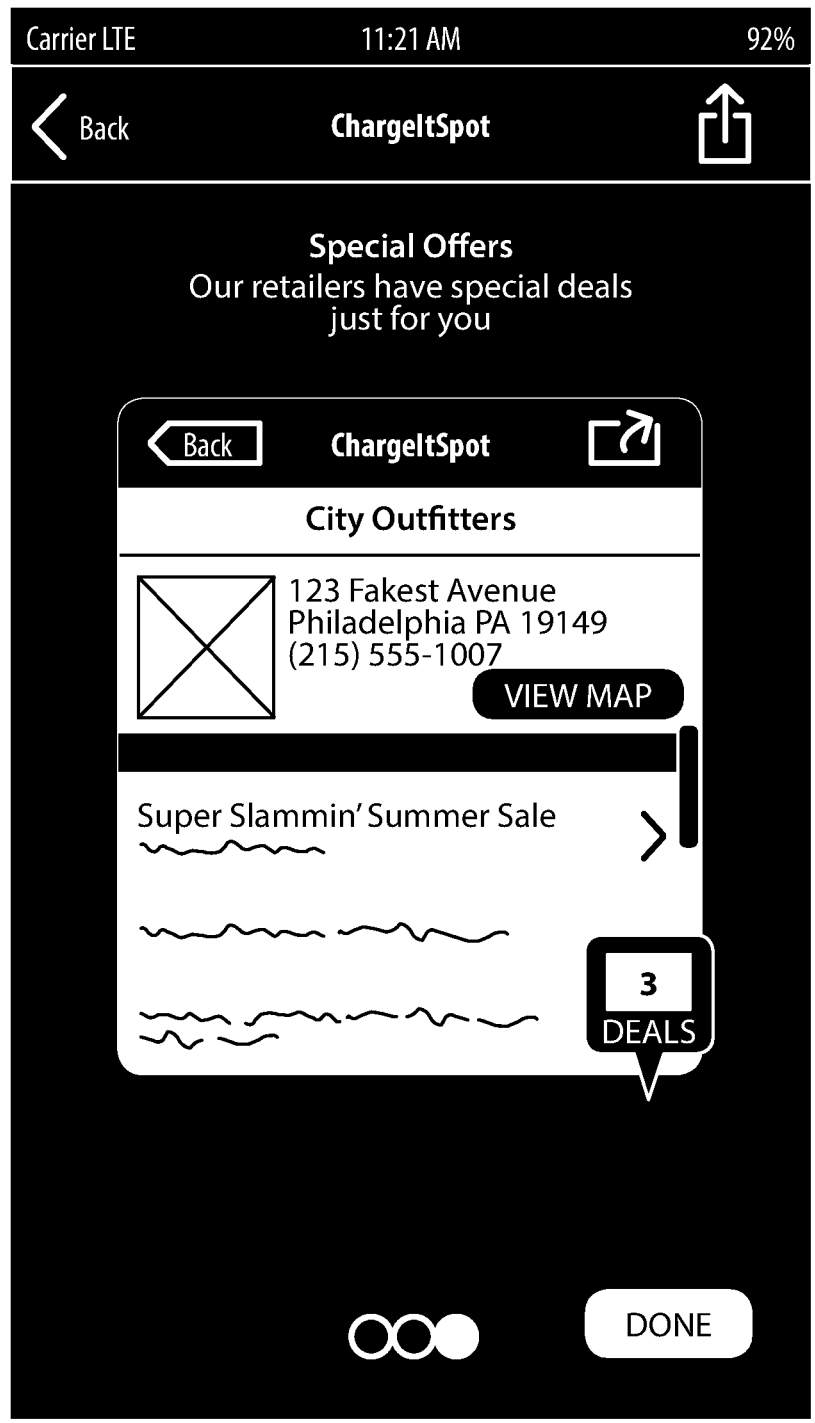

According to exemplary embodiments, advertising content 510 may also be provided to the user on the display screen 502, such as via the mobile application. The advertising content 510 may include instructions on how to take advantage of special offers or deals mentioned in the advertising content 510. For example, upon reaching a charging location, the user may, either prior to recharging or upon at least partially recharging his device at the participating location, show or play (e.g., in the case of audio-based advertising content) the advertising content on the mobile device to the cashier or other staff at the advertised location, such as to obtain any advertised prices, offers or deals, and/or to be given a coupon or the like. In other embodiments, as illustrated in FIG. 5E, the mobile device user may only have to mention that they received advertising content 510 to receive any relevant special offers. In still other embodiments, the user may be given a code, such as a numeric code, a keyword or password, or other like indicator that, once passed to a cashier or store personnel, indicates to the store personnel that the user has indeed received a special offer on his device to use a charging station at that store. In yet further embodiments, upon accessing the advertisement and/or upon reaching the charging location, a credit, such as may be accessible only in the event of a purchase, may be added to a shopper's card, store card, credit card, user account, or the like of that user.

Additionally, in some embodiments, advertising content 510 may include an indication that the mobile device user is already heading toward, or is likely to pass, an advertised location. In other embodiments, advertising content 510 may include directions to the advertised location, and/or may link to a website of the location upon accessing by the user, for example.

Situations may arise where multiple nearby businesses may house a charging station, thus driving competition for the user's "foot traffic," and/or for advertising content space (and/or business location recognition by icon 506) on the user's mobile device display screen 502. Therefore, the server (not shown) may employ a prioritization algorithm to determine which participating business or businesses gets to provide an advertisement (and/or location recognition by icon 506) at any given time and location of the user's mobile device, and/or in what order advertisements are listed, displayed, or preferentially listed or displayed. This prioritization algorithm may be based on any number of factors, which may include, for example, user shopping characteristics and a known relation (such as a known preference) to the items of a participating business or business type, the relative location of the user and participating business, the level of participation of the participating business in the disclosed systems and methods (e.g., the fee amounts paid to house a charging station, paid for user access via the mobile application, paid for user data access and/or accumulation, or the like), and the like. It should be noted, however, that these factors should not be so limited, as the prioritization algorithm may apply other information related to consumers or businesses to determine the advertising content (and/or location recognition by icon 506) to be displayed on the display screen 502 at any given time.

Figure 6:
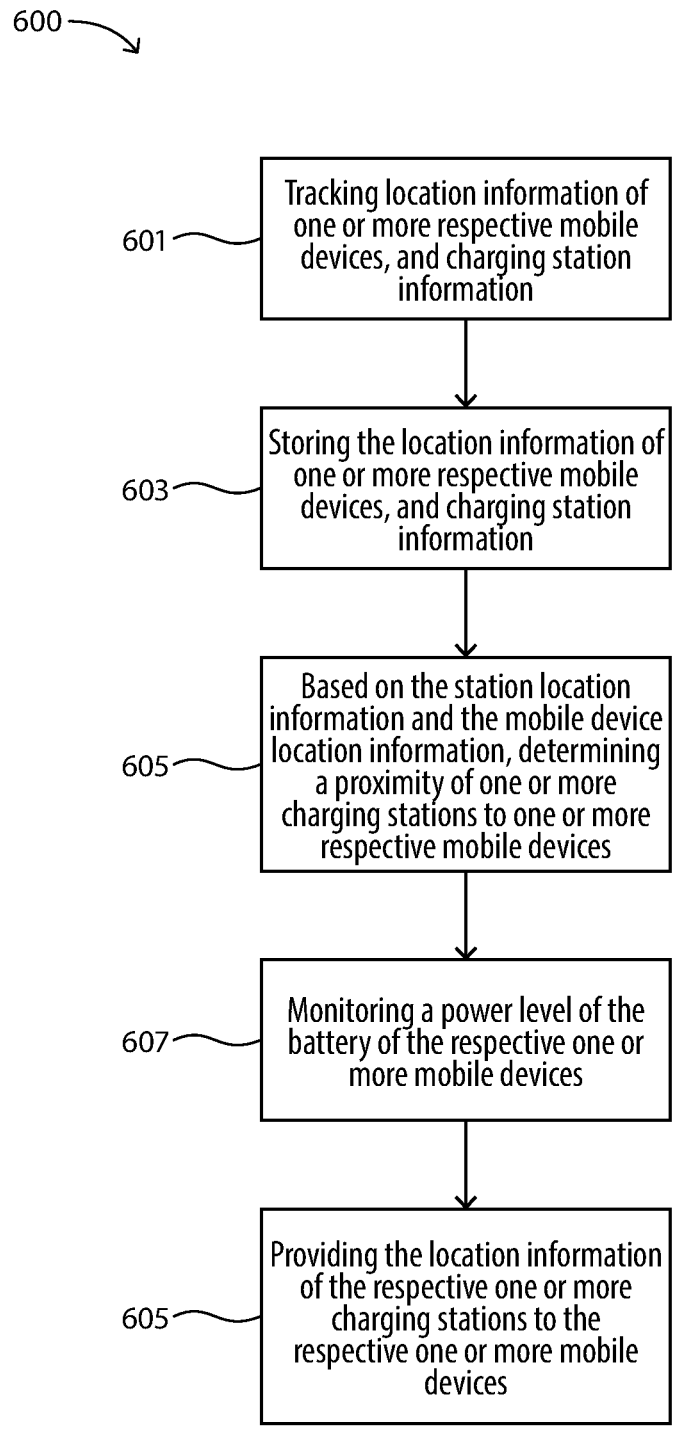
FIG. 6 is an exemplary method employed by the system according to embodiments of the present invention.

In accordance with one or more embodiments described herein, and with reference to FIG. 6, there is shown a methodology 600 operable by a system according to embodiments of the present invention. It is noted that numbers associated with the blocks of FIG. 6 do not imply a particular order in which the corresponding steps are to be performed according to the method 600.

In FIG. 6, step 601 includes having location information of one or more respective mobile devices, and charging station information. Step 603 may include having the location information of one or more respective mobile devices, and charging station information. Based on the station location information and the mobile device location information determining at step 605, a proximity of one or more charging stations to one or more respective mobile devices. Step 607 may include monitoring a power level of the battery of the mobile device. Step 609 may include alerting a mobile device user and providing the location information of the respective one or more charging stations to the mobile device. The location information may be provided to the mobile device based on a power level of the battery of the mobile device decreasing to a certain power level and/or based on a determined proximity of one or more charging stations to the one or more mobile devices.

Further, the mobile app may provide, such as on the map, or in a list or secondary window in conjunction with the map, an indication of one of the registered businesses with local charging stations available and which are making special offers, such as sales, coupons, targeted offers based on the user's history (in the mobile app and/or on the device more generally), and/or unique deals for users of the present invention.

The aforementioned mobile app may serve principally or exclusively to monitor a mobile device charge, and alert a user to a need for recharge, i.e., the disclosed mobile app may be a stand-alone mobile app for alerting a user to a low device battery. The charge threshold for an alert may be predetermined, such as by being preset in the phone or app, or entered by the user, as discussed herein.

Once the user selects one of the registered businesses on the mobile app, the user may seek out and/or be directed to the selected business. Upon arrival, the user may or may not be provided with advertising at the charging station, such as by a display associated with the station. Further, the user may be asked, such as via the same display or via a second display, to enter user information which provides security for the user's device once placed into a charging unit. Additionally or alternatively, the charging unit may secure the device by a physical key.

Via any user-entered information and/or via a profile entered by the user (such as into the mobile app), and/or via user actions, a user profile may be created. For example, redeemed deals and special offers made in the mobile app may be tracked by the disclosed system as an indication of user product and service preferences. The profile may be maintained by the system discussed above, and may allow for targeted marketing, both of the charging services discussed herein, and of third-party goods and services, such as those provided by the registered business and/or by other businesses. For example, geo-targeted ads may be offered via the mobile app.

Moreover, the accumulation of user data and profiles, which may include user shopping data, provides data mining opportunities in the present invention. For example, the data may be indicative of users' usage of GPS, and/or GPS-invoking apps, and the affects thereof on battery life. The data may also indicate battery life by device type, by usage type, or the like. The data may thus serve as a research tool for device manufacturers, or as a purchase tool (i.e., which device has the best battery life, to the extent the data is made publicly available) for a user and/or for a non-user.

Figure 7:
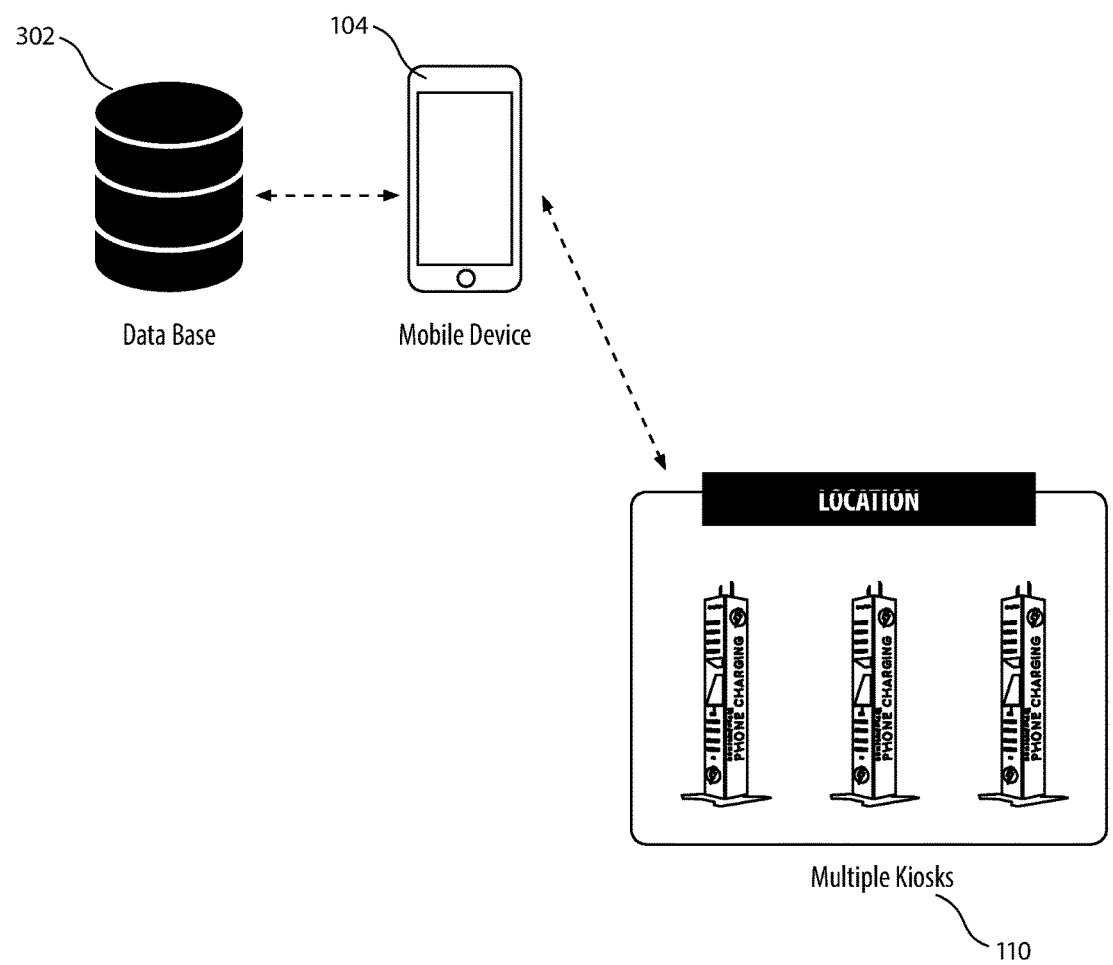
FIG. 7 is an exemplary embodiment of the present invention.

In accordance with the foregoing, and as illustrated in FIG. 7, the disclosed embodiments may provide a network, such as may be formed by the disclosed charging stations 110, businesses (which, although shown in the figure as a "shop," may be any type of public or private business), and mobile devices 104, and, more particularly, as between communicative interconnectivity, advertisers, and user mobile apps. In an example of the disclosed systems and methods, a user may download a mobile app to his device, and may set a 20% level for battery recharging—meaning the user will receive an alert from the mobile app once his phone has less than a 20% battery charge.

By way of non-limiting example, after charging his phone for the first time, the user may be auto-prompted to download the mobile app. Further, the mobile app, and/or participation in the disclosed systems and methods, may be free for consumers, and available for a monthly fee to the registered businesses. Alternatively, a fee may be charged to consumers, or a charge to consumers may vary based on consumer actions. For example, a user's willingness to accept/view/watch one or more advertisements or promotions may cause a modification, such as a decrease or elimination of, any fee due from consumers for the mobile app, the mobile app services, or the charging services. Moreover, the present invention may be free to some businesses, such as those willing to sponsor or host charging units, but may be available at a fee to other businesses.

By way of further, non-limiting example, the charging units/kiosks/lockers discussed throughout may be placed in a registered business subject to, for example, payment of rent. This and other costs to the charging unit provider may be recouped by charging consumers for the services discussed, by accepting sponsorships, by accepting advertisements or promotions to be provided to consumers (which may be from the registered business ultimately used by the user and/or from other registered businesses and/or sponsors) for a fee, and the like. Additionally, payment may be received for other occurrences, such as revenue sharing. For example, a credit card company, such as VISA, may sponsor a kiosk, and thereby the kiosk may be free to use for consumers who swipe a VISA card. For users who do not hold a VISA card, the use of the unit may be free to those consumers if they agree to apply (such as conveniently through an electronic interface at the kiosk) for a VISA card. Upon receipt of an application for a VISA card, VISA may pay a fee to the kiosk provider.

Kiosks/charging stations may be provided by any of a number of charging models. For example, in a first model, the kiosk may be leased, such as monthly. In such embodiments, maintenance may be provided as part of the lease, and other features, such as providing brand wrapping, may be provided for fees. In a second embodiment, a kiosk may be sold to a provider. In such an instance, a charge may occur for any maintenance of the kiosk, as well as providing of other aspects, such as providing a brand wrap for the kiosk.

In yet a third model, the kiosk may be provided based on a branding or sponsorship model. In this model, a particular brand may pay to have a branded kiosk placed at a particular location, such as a retailer. The retailer may allow placement for free, or may request a revenue share with the provider of the kiosk. In such embodiments, maintenance may or may not be an additional charge to the paying brand, and wrapping of a kiosk for advertising purposes, such as on the outer portions of the kiosk, a header panel, such as a backlit header panel, of the kiosk, a kick plate or ad plate at the bottom of the kiosk, or the like, may again constitute an additional charge to the brand payer for the kiosk.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Figure 8:
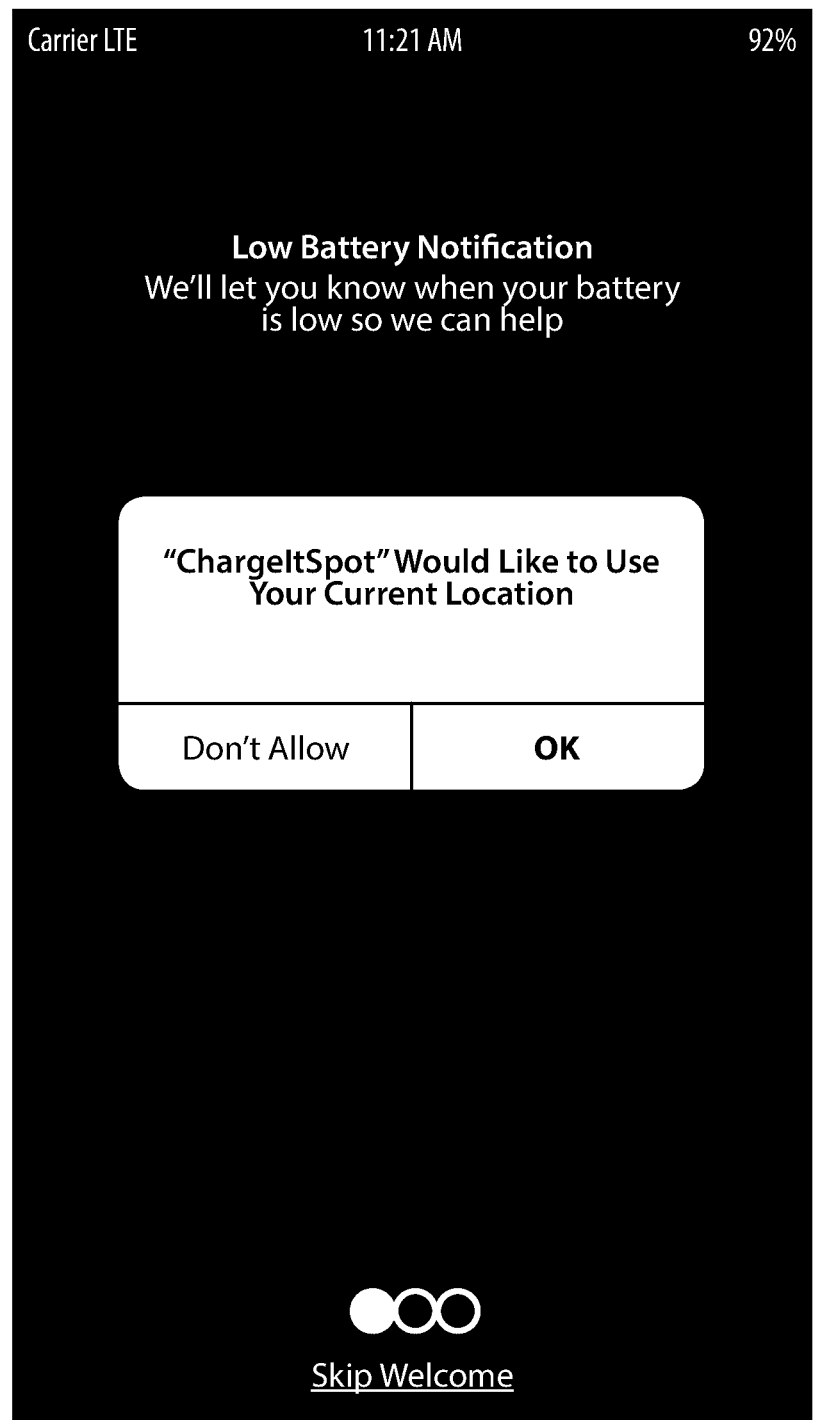
FIG. 8 is an exemplary embodiment of the present invention.

As illustrated in FIG. 8, a graphical user interface ("GUI") associated with the present invention may be provided through an app which may be obtained through any convention means, such as through an app store, for example. Although certain features offered through the GUI may be activated and/or deactivated by the user at any desired time, the app may prompt the user to allow for location based services to provide the most useful user experience in relation to the features described more fully herein.

Figure 9:
FIG. 9 is an exemplary embodiment of the present invention.

The GUI may provide an indication of the charge capacity and the charge remaining in at least one battery and/or battery cell, associated with mobile device 104. The GUI may also include indicators as to page and/or content amount and the location of the user among such options. For example, as illustrated in FIG. 9, pagination of the GUI may be exemplified by the use of small circles which may allow the user to more easily navigation between screens of the GUI. Although many forms of navigation may be used, in a preferred embodiment, the user may toggle between GUI pages by swiping to the left and/or to the right.

Figure 10:
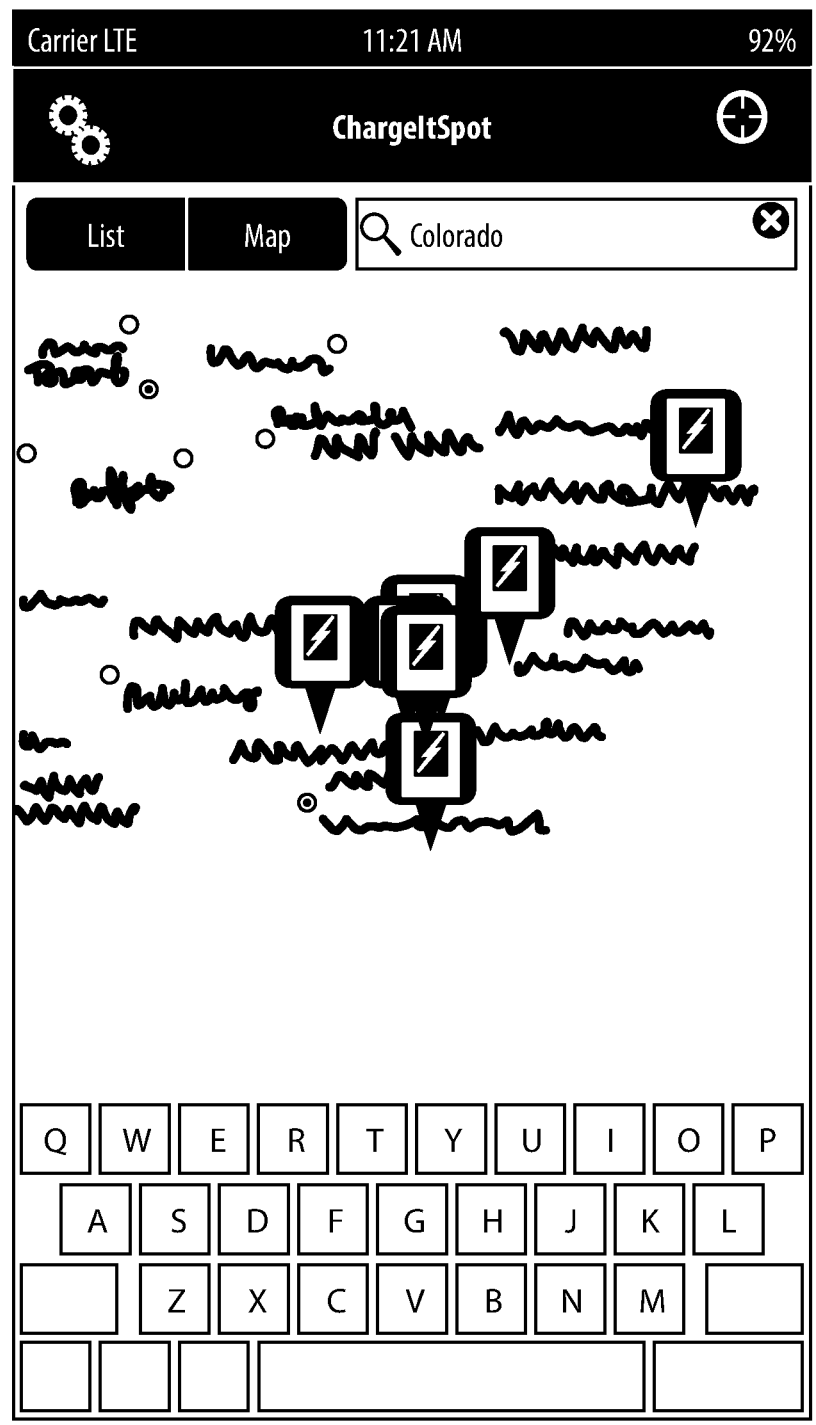
FIG. 10 is an exemplary embodiment of search functionality of the present invention.

As illustrated in FIG. 10, search functionality may be presented through the GUI and used to identify the closest charging location to the user. If, for example, there are not locations within a defined range of the searcher, which range may be predefined or set by the user, the app may collect that information and allow such information to be collected by a third party administrator to inform the administrator of user desired locations. Similarly, such information may allow for the delivery of ads based on the user's location and may allow for the delivery of ads outside the network of ads related to charging locations. Furthermore, as illustrated in FIG. 11, a user may select a proximity distance which may be selected from a list having ¼ mile, ½ mile, 1 mile, 2 miles, 5 miles, and/or 10 miles as choices.

Figure 11:
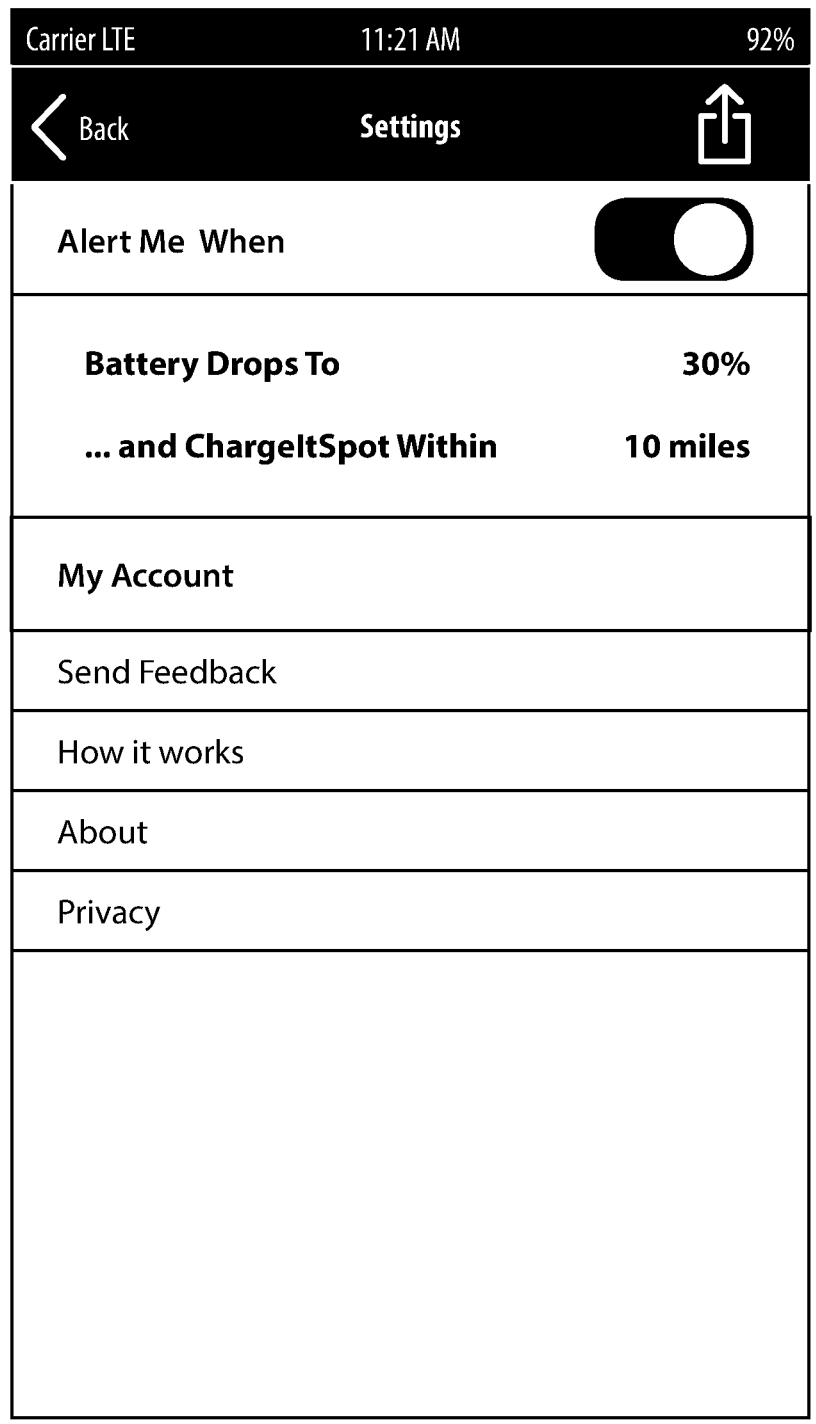
FIG. 11 is an exemplary embodiment of the present invention.
Figure 12:
FIG. 12 is an exemplary embodiment of the present invention.
Figure 13:
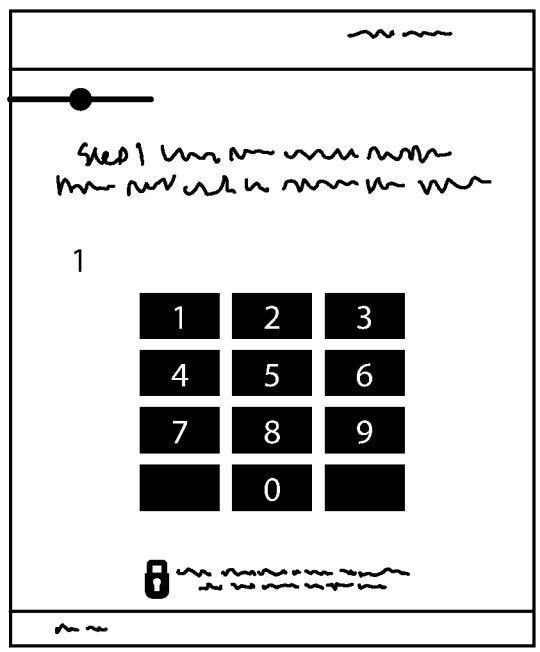
FIG. 13 is an exemplary embodiment of the present invention.
Figure 14:
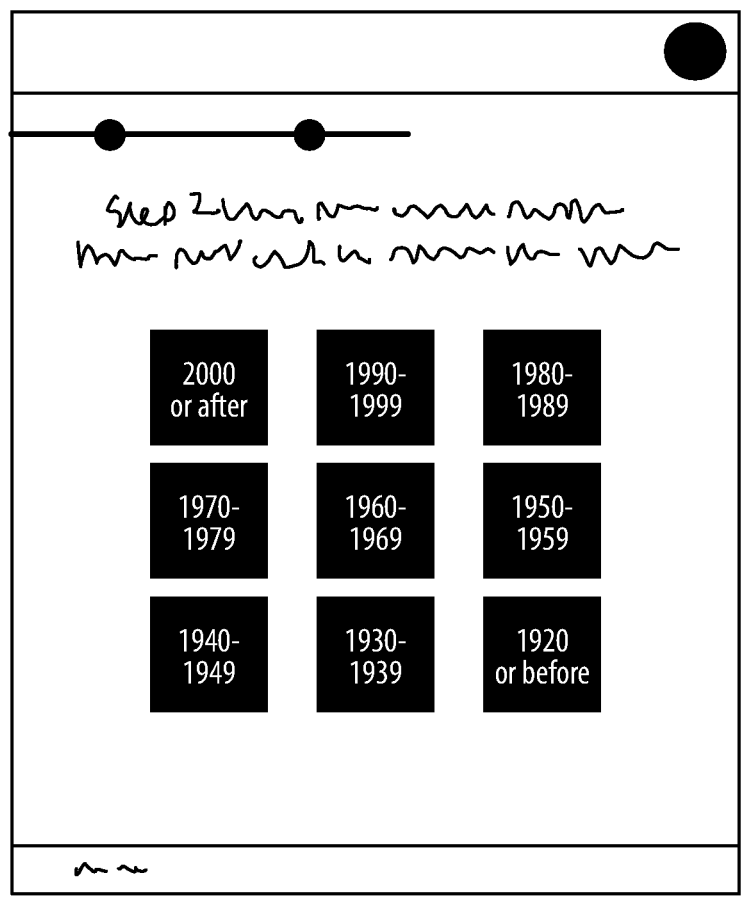
FIG. 14 is an exemplary embodiment of the present invention.
Figure 15:
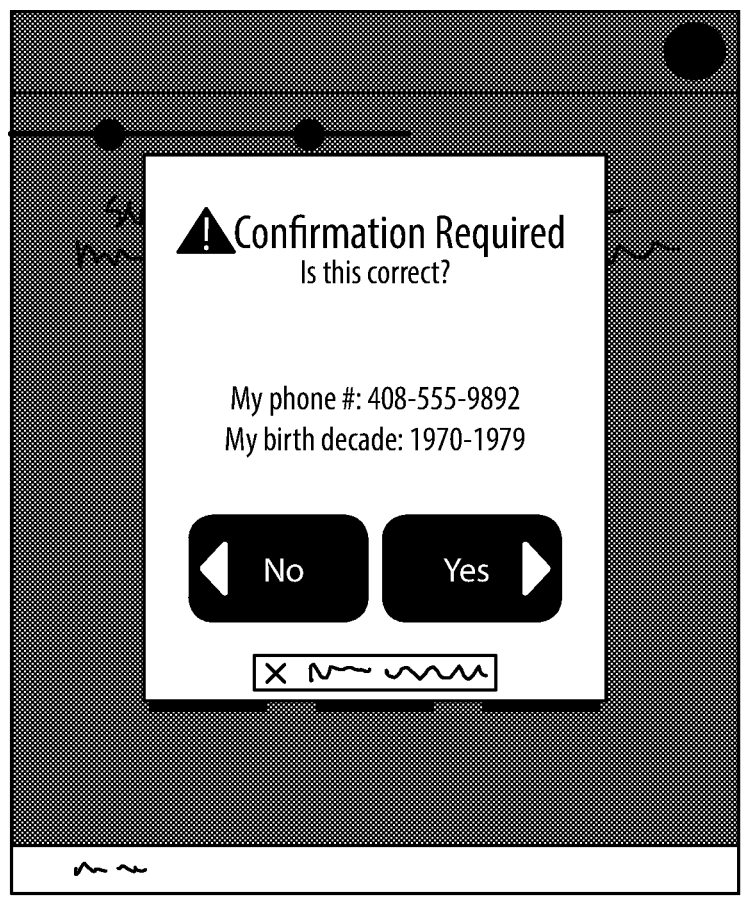
FIG. 15 is an exemplary embodiment of the present invention.
Figure 16:
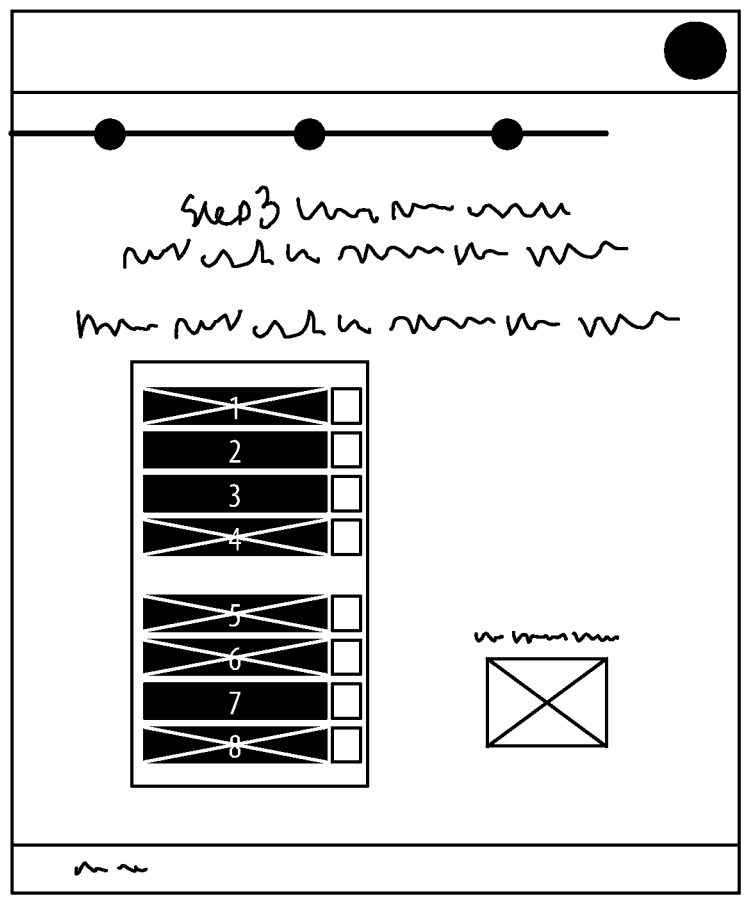
FIG. 16 is an exemplary embodiment of the present invention.

As discussed herein, the battery level of the phone may be brought to the attention of the user and, as illustrated in FIG. 11, such alerts may be customized by the user. The user may activate and deactivate any alerts and may, for example, select a desired level of battery charge for which an alert may be triggered. For example, a user may choose that an alert as to battery life by presented when at least one of the batteries has only about a 30% charge remaining. Although any level of charge may be used to activate an alert, a user may select between 10% and 80% (default is 30%), preferably in increments of 10%. As would be appreciated by those skilled in the art, a battery may fluctuate over time and the percentage charge may be considered an approximation rather than an absolute direct measurement of remaining charge.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A publicly available mobile device charging system, comprising:
   one or more charging kiosks having a plurality of secure lockers sized and shaped to accommodate a mobile telephonic device therein, each secure locker configured to hold therewithin and charge a battery of a single mobile device at a time;
   computing memory having associated therewith code configured to provide:
      kiosk location and associated information for one of the charging kiosks;
      charging profile information of a plurality of different prospective ones of the mobile device to be charged in one of the secure lockers; and
   a processor communicatively coupled with the computing memory, configured to execute the code to:
      based on the kiosk location and associated information, allow a networked server to determine a proximity of the one or more charging kiosks to a location of one of the mobile devices, and to provide the proximity and directions to the proximate one or more charging kiosks the one of the mobile devices; and
      once one of the mobile devices is physically associated with the locker of the one of the charging kiosks, optimally charging the one of the mobile devices by causing the charging kiosk to cycle through the charging profile information to arrive at an optimal one of the charging profile information for the mobile device within the locker, wherein device data on the mobile device is maintained as inaccessible to the code.

2. The system of claim 1, wherein the code further configures the one or more charging kiosks to:
   display to a user of the mobile device a prompt to receive security credentials.

3. The system of claim 2, wherein the security credentials verify the user of the mobile device using video or photo data.

4. The system of claim 3, wherein the video or photo data is requested from the user in response to prior incorrect entry security credentials.

5. The system of claim 1, wherein the proximity and the directions are requested by the mobile device based on the battery level of the mobile device reaching a predetermined threshold.

6. The system of claim 1, wherein the kiosk location information comprises availability status of the lockers associated with the one or more charging kiosks.

7. The system of claim 1, wherein the code is further configured to:
receive entity information associated with entities sponsoring one or more of the charging kiosks.

8. The system of claim 7, wherein the code is further configured to provide the entity information to the respective one or more mobile devices.

9. The system of claim 8, wherein the entity information provided to the mobile device is based on a prioritization algorithm.

10. The system of claim 1, wherein the code is further configured to:
cause the storage of user information associated with the user of the mobile device, wherein the user information consists of the user's security credentials and video or photo data associated with the user.

11. The system of claim 10, wherein the code is further configured to:
compare photo or video taken to the video or photo data associated with the user.

12. The system of claim 11, wherein the code is further configured to: grant access to the locker in response to a match being made in the comparison.

13. The system of claim 11, wherein the code is further configured to: place the locker into a locked state in response to a match not being made in the comparison.

* * * * *